United States Patent
Shen

(10) Patent No.: US 11,231,964 B2
(45) Date of Patent: Jan. 25, 2022

(54) COMPUTING DEVICE SHARED RESOURCE LOCK ALLOCATION

(71) Applicant: Huawei Technologies Co., Ltd., Shenzhen (CN)

(72) Inventor: Shengyu Shen, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 234 days.

(21) Appl. No.: 16/243,582

(22) Filed: Jan. 9, 2019

(65) Prior Publication Data

US 2019/0146845 A1 May 16, 2019

Related U.S. Application Data

(63) Continuation of application No. PCT/CN2017/079065, filed on Mar. 31, 2017.

(51) Int. Cl.
  *G06F 9/50* (2006.01)
  *G06F 9/48* (2006.01)
  *G06F 9/52* (2006.01)
  *G06F 9/46* (2006.01)

(52) U.S. Cl.
  CPC ............. *G06F 9/5027* (2013.01); *G06F 9/46* (2013.01); *G06F 9/4856* (2013.01); *G06F 9/52* (2013.01)

(58) Field of Classification Search
  CPC ........ G06F 9/46; G06F 9/4856; G06F 9/5027; G06F 9/52
  See application file for complete search history.

(56) References Cited

U.S. PATENT DOCUMENTS

| | | | | |
|---|---|---|---|---|
| 5,913,213 A | * | 6/1999 | Wikstrom | G06F 9/52 707/610 |
| 6,141,720 A | * | 10/2000 | Jeffords | G06F 9/52 710/108 |
| 8,635,619 B2 | | 1/2014 | Auernhammer et al. | |

(Continued)

FOREIGN PATENT DOCUMENTS

| | | |
|---|---|---|
| CN | 1945539 A | 4/2007 |
| CN | 101051281 A | 10/2007 |

(Continued)

OTHER PUBLICATIONS

T. E. Anderson, The Performance of Spin Lock Alternatives for Shared-Memory Multiprocessors, Jan. 1990, IEEE Transactions on Parallel and Distributed Systems, vol. 1, No. 1, (Year: 1990).*

(Continued)

*Primary Examiner* — Jorge A Chu Joy-Davila
(74) *Attorney, Agent, or Firm* — Conley Rose, P.C.

(57) ABSTRACT

A lock allocation method and apparatus, and a computing device to resolve a problem of lock contention, where the method includes a first node controller (NC) receives a first migration queue from a second NC, allocates a first target lock to a first central processing unit (CPU) associated with the first NC, deletes the first lock request at the queue head in the first migration queue when receiving a request for releasing the first target lock from the first CPU, changes a lock flag bit of a second lock request to a lock flag bit indicating a locked state when the first migration queue is not empty, determines a third NC sending the second lock request, and sends the first migration queue to the third NC.

20 Claims, 11 Drawing Sheets

(56) References Cited

U.S. PATENT DOCUMENTS

| | | | |
|---|---|---|---|
| 2008/0104600 A1 | 5/2008 | May | |
| 2008/0184249 A1 | 7/2008 | Adams et al. | |
| 2015/0281336 A1* | 10/2015 | Beale | G06F 9/5088 709/201 |
| 2016/0019100 A1 | 1/2016 | Xu et al. | |
| 2019/0155795 A1* | 5/2019 | Xiao | G06F 9/52 |

FOREIGN PATENT DOCUMENTS

| | | |
|---|---|---|
| CN | 1973266 B | 5/2010 |
| CN | 101290588 B | 6/2010 |
| CN | 101256509 B | 9/2010 |
| CN | 102298539 A | 12/2011 |
| CN | 102566979 A | 7/2012 |
| CN | 104102549 A | 10/2014 |
| CN | 104346317 A | 2/2015 |
| EP | 0752651 A2 | 1/1997 |

OTHER PUBLICATIONS

Machine Translation and Abstract of Chinese Publication No. CN101051281, Oct. 10, 2007, 17 pages.
Machine Translation and Abstract of Chinese Publication No. CN102566979, Jul. 11, 2012, 25 pages.
Machine Translation and Abstract of Chinese Publication No. CN104346317, Feb. 11, 2015, 19 pages.
Foreign Communication From A Counterpart Application, PCT Application No. PCT/CN2017/079065, English Translation of International Search Report dated Jun. 30, 2017, 2 pages.

\* cited by examiner

COMPUTING DEVICE SHARED RESOURCE LOCK ALLOCATION

CROSS-REFERENCE TO RELATED APPLICATIONS

This application is a continuation of International Patent Application No. PCT/CN2017/079065 filed on Mar. 31, 2017, which is hereby incorporated by reference in its entirety.

TECHNICAL FIELD

The present application relates to the computer field, and in particular, to a lock allocation method and apparatus, and a computing device.

BACKGROUND

Each shared resource in a computing device has one lock, and the lock is used to control permission to access the shared resource by different processors. Before accessing a shared resource, a processor needs to read a status of a lock of the shared resource. The lock status is indicated using a lock flag bit. For example, "1" indicates that the lock status is an occupied state, and "0" indicates that the lock status is an idle state. If the lock flag bit indicates an idle state, a visitor can access the shared resource corresponding to the lock, and update the lock status to an occupied state. After the access ends, the visitor updates the lock status to an idle state. If a processor reads that the lock flag bit indicates an occupied state, the processor continues to wait and cannot access the shared resource until the processor finds that the lock flag bit indicates an idle state. A lock mechanism can ensure that a processor accesses a shared resource in an exclusive manner.

In a multi-central processing unit (CPU) computer, a plurality of CPUs use a same memory as a shared resource, and each CPU has a private cache. The cache can cache a copy of data in the memory. A lock contention process in a multi-CPU computing device is described below based on FIG. 1 and FIG. 2. In FIG. 1, the computing device includes four CPUs that are respectively a CPU 1, a CPU 2, a CPU 3, and a CPU 4. The CPU 1 has a cache 1, the CPU 2 has a cache 2, the CPU 3 has a cache 3, and the CPU 4 has a cache 4. The foregoing four CPUs share one memory, and each CPU is responsible for managing different storage spaces in the same memory. A lock flag bit is stored in a memory. Correspondingly, a data copy of the lock flag bit is stored in a cache of a processor that manages the memory. If the CPU 2 needs to access a shared resource, the CPU 2 first needs to obtain a lock of the shared resource. A process of obtaining the lock by the CPU 2 includes the following steps. First, a lock address is determined. The lock address is an address of a lock flag bit in a memory. If the CPU 2 finds that the memory in which the lock flag bit of the shared resource is located is managed by the CPU 4, the CPU 2 sends a write request to the CPU 4. The CPU 4 records a mapping relationship between a shared resource managed by the CPU 4 and a processor that accesses the shared resource. The processor that accesses the shared resource includes a processor that completes access to the shared resource and a processor that is accessing the shared resource. It is assumed that the CPU 4 determines, using the mapping relationship between the shared resource managed by the CPU 4 and the processor that accesses the shared resource, that the CPU 1 and the CPU 3 have accessed the shared resource managed by the CPU 4. Correspondingly, the cache 1 of the CPU 1 and the cache 3 of the CPU 3 each store a data copy of the lock flag bit. When the CPU 4 receives the write request of the CPU 2, the CPU 4 separately sends listening requests to the CPU 1 and the CPU 3. The listening request is used to perform invalidation processing on the lock flag bit in the cache 1 and the lock flag bit in the cache 3, for example, changing a status of the lock flag bit in the cache 1 to empty or deleting information about the lock flag bit from the cache 1. If the CPU 1 associated with the cache 1 completes use of the shared resource, after performing invalidation processing on the lock flag bit in the cache 1, the CPU 1 immediately sends a listening response to the CPU 2. The listening response is used to indicate that the CPU 1 completes access to the shared resource. If the CPU 1 does not complete access to the shared resource, after completing the access to the shared resource, the CPU 1 sends a listening response to the CPU 2. Similarly, a processing process after the CPU 3 receives the listening request is the same as that of the CPU 1. After obtaining listening responses returned by the CPU 1 and the CPU 3, the CPU 2 sends a message to the CPU 4 to instruct the CPU 4 to change the lock flag bit to an occupied state such that the CPU 2 can access the shared resource.

It can be learned from the foregoing lock contention process that, when a CPU obtains a lock, a processor managing a memory in which a lock address is located needs to send a listening request to a CPU associated with a cache that stores a data copy of a lock flag bit, and the CPU requesting the lock can access a shared resource only after receiving listening responses returned by CPUs associated with all caches that store the data copy of the lock flag bit. Each CPU needs to transmit and receive a large quantity of listening requests and listening responses in a process of obtaining a lock. This consumes transmission bandwidth and processing capabilities of a large quantity of CPUs, and increases a delay of obtaining a lock by the CPU.

SUMMARY

This application discloses a lock allocation method and apparatus, and a computing device, to avoid a problem of a delay caused by a case in which lock invalidation can be determined only after a large quantity of packets are transmitted between processors during a lock contention process.

According to a first aspect, this application discloses a lock allocation method. A computing device includes a plurality of CPUs and a plurality of node controllers (NCs). There are at least two CPUs in the computing device, and a quantity of CPUs is equal to a quantity of NCs. The CPUs are in a one-to-one correspondence with the NCs. Each NC includes a local queue and at least one remote queue. A queue in the local queue and the remote queue is a data structure used to store a lock request. A lock request in each queue is processed according to a first in first out sequence, that is, a dequeue operation can be performed on only a queue head of the queue, and an adding operation can be performed only behind a queue tail of the queue. The local queue of the NC stores a lock request sent by a CPU associated with the NC. The remote queue is used to store a plurality of lock requests for requesting a same lock. The lock requests include a lock request sent by the CPU associated with the NC in which the remote queue is located, and a lock request sent by another CPU. Each NC manages at least one lock, and a quantity of remote queues in each NC is equal to a quantity of locks managed by the NC. The remote queues are in a one-to-one correspondence with the locks in each NC. In this application, the quantity of locks managed by each NC, a length of the local queue, and a length of the remote queue are not limited, and may be set according to needs. In this application, the plurality of NCs include a first NC, a second NC, and a third NC, and the lock allocation method includes the following.

The first NC receives a first migration queue generated by the second NC, and the second NC manages a first target lock. The first migration queue includes at least one lock request. All lock requests included in the first migration queue are used for requesting a same lock. The first NC processes the lock request in the first migration queue according to a first in first out sequence, that is, performs a dequeue operation on only a queue head of the first migration queue, and performs an adding operation only behind a queue tail of the first migration queue. The queue head of the first migration queue is a first lock request, and the first lock request includes an identifier (also referred to as ID) of the first NC. In a subsequent description, a lock requested by the first lock request is referred to as the first target lock. The first NC allocates the first target lock to an associated first CPU. The first CPU releases the first target lock after completing access to a shared resource corresponding to the first target lock. Releasing the first target lock indicates that the first CPU no longer occupies the first target lock, and the first CPU instructs the first NC to release the first target lock. The first NC deletes the first lock request from the first migration queue. After the first lock request is deleted from the first migration queue, if a to-be-processed lock request still exists in the first migration queue, the first NC changes, to a lock flag bit indicating a locked state, a lock flag bit of a lock request at the queue head in the first migration queue at a current moment, and sends the first migration queue to the third NC that sends the lock request at the queue head in the first migration queue at a current moment.

Optionally, a stack may alternatively be used to store a lock request in this application, and a lock request in each stack is processed according to a first in last out sequence.

In the first aspect of this application, an NC receives a migration queue that includes a plurality of lock requests for requesting a same lock, a sorting sequence of the lock requests in the migration queue is the same as a sequence in which an NC managing the lock receives a lock request sent by each CPU, and the NC allocates, to an associated CPU, the lock requested by a lock request at a queue head in the migration queue. In a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock.

In a possible implementation of this aspect, the first NC receives a third lock request sent by the associated first CPU. The third lock request is used to request the first target lock. The first NC may add the third lock request behind a queue tail of a local queue of the first NC according to a first in first out sequence, and the first NC may process a lock request in the local queue according to a first in first out sequence. When the third lock request is a lock request at a queue head in the local queue, the identifier of the first NC is added to the third lock request to obtain the first lock request. The first lock request may carry identifier information of the first NC. The first NC determines that the first target lock is managed by the second NC, and determines that the first target lock is associated with a target remote queue in the second NC. The first NC sends the first lock request to the second NC such that the second NC takes out the at least one lock request from the remote queue associated with the first target lock to form the first migration queue. During implementation of this embodiment, an NC receives and processes a lock request in a local queue according to a first in first out sequence in order to process the lock request in order. The local queue can provide a buffer function to avoid a problem that the NC receives a large quantity of lock requests and cannot process the lock requests in a timely manner.

In a possible implementation of this aspect, the first NC selects a target remote queue from at least one remote queue managed by the first NC. The method for selecting the target remote queue by the first NC may be performed in any one of the following manners. The first NC each time selects the target remote queue from the at least one remote queue in descending order of priorities, or selects, from the at least one remote queue, a remote queue in which a quantity of lock requests is the largest as the target remote queue, or randomly selects a remote queue from a plurality of remote queues as the target remote queue, or selects the target remote queue using another selection method. This is not limited in this application. The target remote queue includes at least one lock request for requesting a second target lock. The first NC takes out the at least one lock request from the target remote queue, and generates a second migration queue according to the at least one lock request. The second migration queue includes at least one lock request for requesting the same lock. A sorting sequence of the lock request in the second migration queue is the same as a sequence in which the lock request is stored in the source target remote queue. The first NC allocates the second target lock to a fourth lock request at a queue head in the second migration queue, the first NC determines a fourth NC that sends the fourth lock request in the second migration queue, and the first NC sends the second migration queue to the fourth NC.

According to the description of the foregoing process, an NC selects a target remote queue from a plurality of remote queues according to a preset selection policy, and takes out a lock request from the target remote queue to form a new migration queue. A sorting sequence of the lock request in the migration queue is the same as a sequence in which the lock request is stored in the source target remote queue, and a dequeue operation and an enqueue operation are still performed on the lock request in the second migration queue in a first in first out manner. Different manners in which the target remote queue is selected are used to adapt to different service scenarios, and improve flexibility.

In a possible implementation of this aspect, that the first NC allocates the first target lock to an associated first CPU includes the following. After receiving the first migration queue, the first NC obtains a lock flag bit carried in the first lock request at the queue head in the first migration queue. It may be understood that, in this case, the lock flag bit carried in the first lock request indicates a locked state. The first NC updates, according to the lock flag bit of the first lock request, a lock flag bit of the third lock request stored in the local queue in the first NC such that the lock flag bit of the third lock request is consistent with the lock flag bit of the first lock request. After updating, the lock flag bit of the third lock request indicates a locked state. After the first CPU sends the third lock request to the first NC, the first NC stores the third lock request in the local queue, and the first NC may notify the first CPU of a location of the third lock request in the local queue. The first CPU queries, at the location, whether the lock flag bit of the third lock request indicates a locked state. If the lock flag bit of the third lock request does not indicate a locked state, the first CPU continues to query. If the lock flag bit of the third lock request indicates a locked state, the first CPU obtains the first target lock, and the first CPU obtains permission to access the shared resource corresponding to the first target lock. When the first CPU completes the access to the shared resource, the first CPU releases the first target lock, and the first CPU sends, to the first NC associated with the first CPU, a request for releasing the first target lock. When receiving the request, the first NC deletes the third lock request from the local queue of the first NC.

During implementation of this embodiment of the present application, after a CPU sends a lock request to an associated NC, the CPU queries a lock flag bit of the lock request in a local queue of the associated NC. The NC updates the lock flag bit of the corresponding lock request in the local queue according to an indication of a lock flag bit of a lock request at a queue head in a received migration queue. When finding that the lock flag bit of the lock request in the local queue indicates a locked state, the CPU obtains permission to access a shared resource corresponding to a lock in order to avoid a case in which packet transmission and receiving are performed between a plurality of CPUs in a lock contention process, and reduce a delay and processing overheads of obtaining the lock by the CPU.

In a possible implementation of this aspect, when receiving the request that is for releasing the first target lock and that is sent by the first CPU, the first NC deletes the third lock request from the local queue.

In a possible implementation of this aspect, when the first NC determines that the current first migration queue is empty, that is, no to-be-processed lock request exists in the current first migration queue, the first NC returns a response packet to the second NC associated with the first target lock. The response packet is used to indicate that all lock requests in the first migration queue are processed.

During implementation of the foregoing embodiment, when processing of a migration queue is completed, a source NC of a last lock request in the migration queue can notify, by transmitting only one packet, an NC managing a lock that lock request processing is completed in order to prevent a notification message from being sent each time the lock is released, and reduce a quantity of transmitted messages. In this way, requirements on transmission bandwidth and a processing capability of a processor in this embodiment are low.

In conclusion, in this application, an NC receives a migration queue that includes a plurality of lock requests for requesting a same lock, a sorting sequence of the lock requests in the migration queue is the same as a sequence in which an NC managing the lock receives a lock request sent by each CPU, and the NC allocates, to an associated CPU, the lock requested by a lock request at a queue head in the migration queue. In a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock. Further, after receiving a request that is for releasing the lock and that is sent by the CPU, the NC deletes the lock request at the queue head in the migration queue, changes a lock flag bit of a lock request at the queue head in the migration queue at a current moment, and sends the migration queue to an NC corresponding to the lock request at the queue head in the migration queue at the current moment in order to avoid a problem that a plurality of request messages are produced because after the lock is returned to the NC that manages the lock, another NC requesting the same lock requests the lock again from the NC that manages the lock, thereby reducing a quantity of request messages. Furthermore, in a process in which an NC obtains a lock, the lock is allocated, in sequence using a migration queue, to each CPU that requests the lock, and whether the lock is in a locked state is recorded using a lock flag bit in the migration queue of an NC. In the process of obtaining the lock, the CPU does not need to access a memory and a cache that are associated with the CPU in order to avoid a problem that storage bandwidth is consumed because the CPU needs to access, in a process of determining whether use of a shared resource is completed, the cache or the memory that are associated with the CPU.

According to a second aspect, this application provides a computing device, where the computing device includes a plurality of CPUs and a plurality of NCs, the plurality of CPUs are in a one-to-one correspondence with the plurality of NCs, each NC manages a local queue and at least one remote queue, the local queue is used to store a lock request sent by a CPU associated with the NC, each remote queue is used to store at least one lock request for requesting a same lock, the plurality of CPUs include a first CPU, and the plurality of NCs include a first NC, a second NC, and a third NC, the first CPU is configured to send a third lock request to the associated first NC, where the third lock request is used to request a first target lock, query a lock flag bit of the third lock request in a local queue of the first NC, and when finding that the lock flag bit of the third lock request indicates a locked state, obtain the first target lock and access a shared resource corresponding to the first target lock, and after completing the access to the shared resource, send, to the first NC, a request for releasing the first target lock, the first NC is configured to receive the third lock request sent by the first CPU, add the third lock request to the local queue, and determine the second NC that manages the first target lock, and generate a first lock request according to the third lock request, where the first lock request is obtained by replicating the third lock request, and send the first lock request to a remote queue that is associated with the first target lock and that is in the second NC, where the local queue of the first NC is used to store a lock request sent by the first CPU, and the remote queue associated with the first target lock is used to store at least one lock request for requesting the first target lock, the second NC is configured to receive the first lock request, add the first lock request to the remote queue associated with the first target lock, take out at least one lock request from the remote queue associated with the first target lock to generate a first migration queue, change a lock flag bit of the first lock request at a queue head in the first migration queue to a lock flag bit indicating a locked state, and send the first migration queue to the first NC, the first NC is further configured to receive the first migration queue, determine the first lock request at the queue head in the first migration queue, allocate the first target lock to the first CPU, and delete the first lock request from the first migration queue when receiving the request that is for releasing the first target lock and that is sent by the first CPU, change a lock flag bit of a second lock request to a lock flag bit indicating a locked state when a to-be-processed lock request exists in the first migration queue, where the second lock request is a lock request at the queue head in the first migration queue from which the first lock request is deleted, and the locked state is used to indicate that the first target lock is occupied, and send the first migration queue to the third NC that sends the second lock request, and the third NC is configured to receive the first migration queue sent by the first NC, and change, according to the lock flag bit of the second lock request, a lock flag bit that is of a lock request corresponding to the second lock request and that is in a local queue of the third NC, where the local queue of the third NC is used to store a lock request sent by a CPU associated with the third NC.

In an application of the second aspect, an NC receives a migration queue, where the migration queue stores a plurality of lock requests for requesting a same lock, and the lock requests are queued in the migration queue according to a sequence of requesting the lock, and the NC allocates, to an associated CPU, the lock requested by a lock request at a queue head in the migration queue. In this way, in a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock.

In a possible implementation of the second aspect, the plurality of NCs further include a fourth NC, and the first NC is further configured to select a target remote queue from at least one remote queue managed by the first NC, take out at least one lock request from the target remote queue, generate a second migration queue according to the at least one lock request, allocate a second target lock to a fourth lock request at a queue head in the second migration queue, and send the second migration queue to the fourth NC that sends the fourth lock request, and the fourth NC is configured to receive the second migration queue sent by the first NC.

In a possible implementation of the second aspect, that the second NC performs an operation of allocating the first target lock to the first lock request at the queue head in the first migration queue includes the following. The second NC determines the first lock request at the queue head in the first migration queue, and changes the lock flag bit of the first lock request to a lock flag bit indicating a locked state.

In a possible implementation of the second aspect, that the first NC performs operations of determining the first lock request at the queue head in the first migration queue and allocating the first target lock to the first CPU associated with the first NC includes changing, according to the lock flag bit of the first lock request, the lock flag bit of the third lock request stored in the local queue of the first NC to a lock flag bit indicating a locked state, to instruct the first CPU to access, when finding that the lock flag bit of the third lock request indicates a locked state, the shared resource corresponding to the first target lock, or changing, according to the lock flag bit of the first lock request, the lock flag bit of the third lock request stored in the local queue of the first NC to a lock flag bit indicating a locked state, and instructing the first CPU to access the shared resource corresponding to the first target lock.

In a possible implementation of the second aspect, the first NC is further configured to delete the third lock request from the local queue of the first NC when receiving the request that is for releasing the first target lock and that is sent by the first CPU.

In a possible implementation of the second aspect, the first NC is further configured to send a response packet to the second NC when no to-be-processed lock request exists in the first migration queue, where the response packet is used to indicate that the at least one lock request in the first migration queue generated by the second NC is processed.

According to a third aspect, this application provides a lock allocation apparatus, the lock allocation apparatus includes a receiving unit, a processing unit, and a sending unit, and the units included in the lock allocation apparatus are configured to perform the lock allocation method according to any one of the first aspect or the possible implementations of the first aspect.

According to a fourth aspect, this application provides a NC, the NC includes a processing circuit, a storage circuit, a communications circuit, and a bus, the processing circuit, the storage circuit, and the communications circuit are connected and communicate with each other using the bus, the storage circuit is configured to store a computer-executable instruction, and when the NC runs, the processing circuit executes the computer-executable instruction in the storage circuit to perform operation steps of the method according to any one of the first aspect or the possible implementations of the first aspect using a hardware resource in the NC.

According to a fifth aspect, this application provides a computer readable storage medium, the computer readable storage medium stores an instruction, and when the instruction is run on a computer, the computer executes the method according to any one of the first aspect or the possible implementations of the first aspect.

According to a sixth aspect, this application provides a computer-readable storage medium, the computing device readable storage medium stores an instruction, and when the instruction runs on a computing device, the computing device performs the method according to any one of the second aspect or the possible implementations of the second aspect.

Based on the implementations provided in the foregoing aspects, this application may further provide more implementations through further combination.

BRIEF DESCRIPTION OF DRAWINGS

To describe the technical solutions in some of the embodiments of the present application more clearly, the following briefly describes the accompanying drawings describing some of the embodiments.

DESCRIPTION OF EMBODIMENTS

The following describes the technical solutions in some of the embodiments of the present application with reference to the accompanying drawings in some of the embodiments of the present application.

Figure 1:
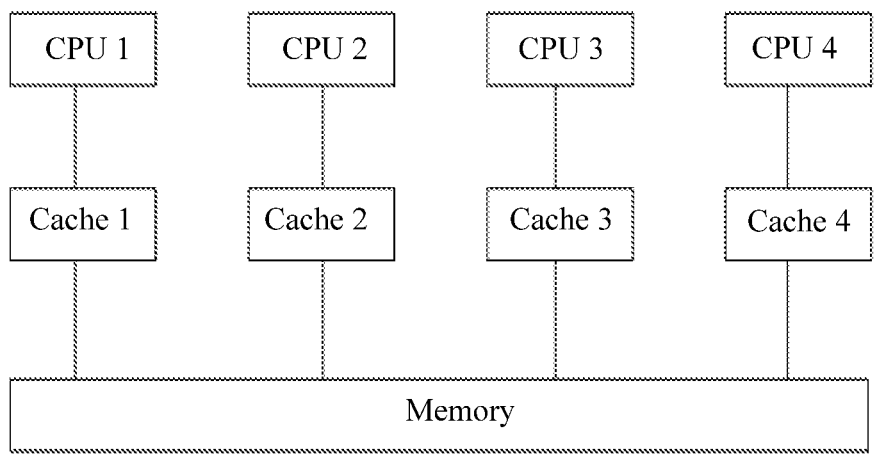
FIG. 1 is a schematic structural diagram of a computing device.
Figure 2:
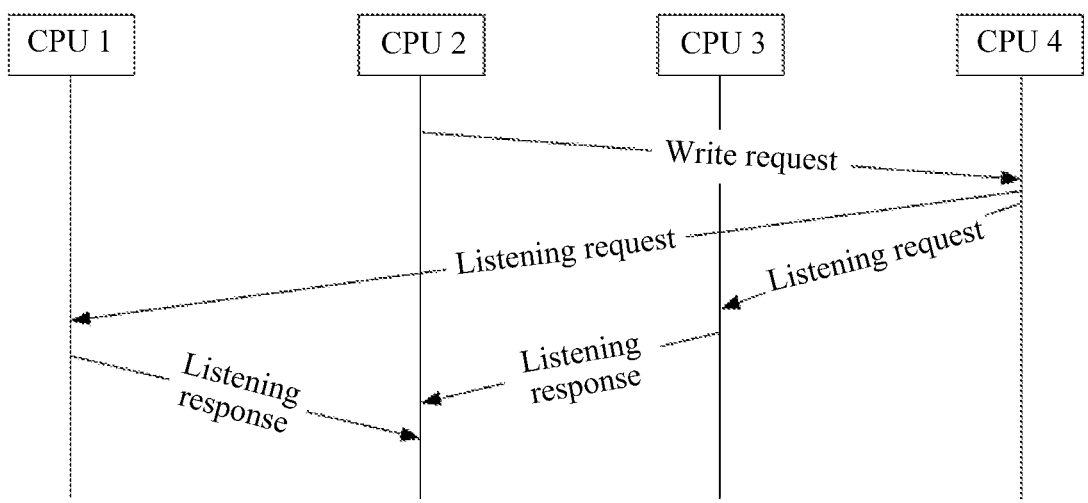
FIG. 2 is a schematic flowchart of a lock contention method.
Figure 3:
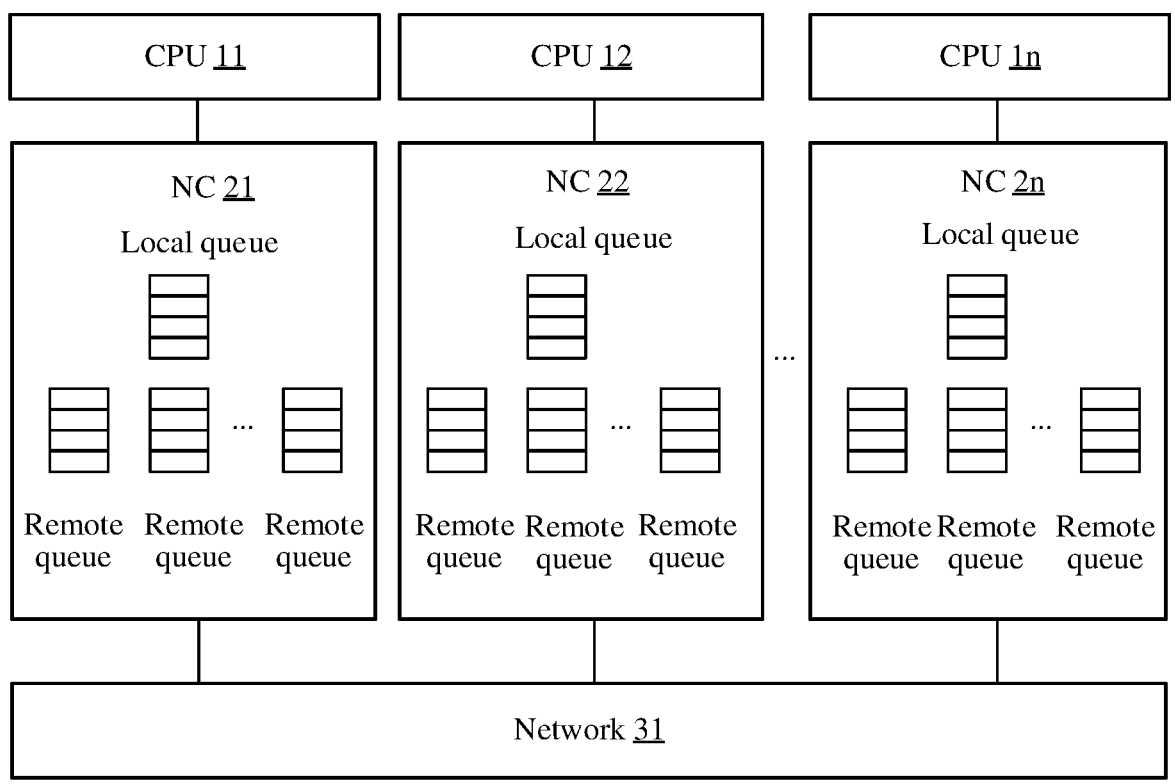
FIG. 3 is a schematic structural diagram of a computing device according to an embodiment of the present application.

Referring to FIG. 3, FIG. 3 is a schematic structural diagram of a computing device according to an embodiment of the present application. In this embodiment of the present application, the computing device includes n processors and n NCs, and n is an integer greater than 1. The processor may be a CPU, or may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor or any conventional processor. This embodiment is further described in detail below using the CPU as an example.

The n processors are a CPU 11, a CPU 12, . . . , and a CPU 1*n*, and the n NCs are an NC 21, an NC 22, . . . , and an NC 2*n*. The n CPUs are in a one-to-one correspondence with the n NCs. A CPU and an associated NC are connected to each other. The NC is an independent hardware chip, and may be configured to increase a quantity of interconnected CPUs, that is, an indirect connection between CPUs that are not connected using a system bus may be implemented using the NC. For example, two CPUs may be connected to one NC, and an indirect interconnection between the two CPUs is implemented using the NC, or an interconnection between two CPUs may be implemented using a plurality of NCs. The NC may be further configured to request a lock resource and manage a shared resource corresponding to a CPU associated with the NC. The NC includes a processing circuit for data processing, a storage circuit for data storage, and a communications circuit that is used for communication between the NC and the processor. An interconnection and communication between NCs are implemented using a network 31. The network 31 is a communications network including one or more NCs, and any two NCs in the n NCs may perform point-to-point communication using the network 31. For example, the network 31 is a quick path interconnect (QPI) network or a hyper transport (HT) network. Each NC includes a local queue and at least one remote queue. A queue in the local queue and the remote queue is a data structure used to store a lock request, and an access request message in each queue is processed according to a first in first out (FIFO) sequence, that is, a dequeue operation can be performed on only a queue head of the queue, and an adding operation can be performed only behind a queue tail of the queue. The local queue of the NC stores a lock request sent by a CPU associated with the NC. The remote queue is used to store a plurality of lock requests for requesting a same lock. The lock requests include a lock request sent by the CPU associated with the NC in which the remote queue is located, and a lock request sent by another CPU. The remote queue in each NC is in a one-to-one correspondence with a lock managed by the NC. Each NC stores a mapping relationship between an ID of the remote queue and a lock address of the lock managed by the NC. The lock is used to control an access permission to access a shared resource by different CPUs. The lock address is a memory address of a lock flag bit of the lock in a memory.

The lock flag bit indicates a lock status. Different values of the lock flag bit indicate different lock states. For example, the lock flag bit "1" indicates that the lock is occupied, and the lock flag bit "0" indicates that the lock is not occupied. That the lock is occupied may also be referred to as a "locked" state, and that the lock is not occupied may also be referred to as an "unlocked" state. To avoid data inconsistency in the shared resource, only one visitor is allowed to access the shared resource at a same moment in the computing device. The shared resource may be a hardware resource or a software resource. For example, the hardware resource includes memory space or storage space of a Peripheral Component Interconnect Express (PCIE) card, and the PCIE card may be a redundant array of independent disks (RAID) card or another hardware with storage space or memory space. The software resource includes a table that is of a database and that is stored in a memory or a cache. A lock is set for each shared resource, and a visitor in the computing device can access a shared resource corresponding to a lock only when obtaining the lock. The visitor in the computing device is a processor.

In a possible implementation, each NC runs two modules a remote agent and a local agent. The local agent is configured to perform an operation related to the local queue in the NC. For example, the local agent performs operations such as an enqueue operation, a dequeue operation, and sending a lock request. The remote agent is configured to perform an operation related to all remote queues in the NC. For example, the remote agent performs operations such as selecting a remote queue, an enqueue operation, a dequeue operation, generating a migration queue, allocating a lock, and sending a migration queue.

Figure 4:
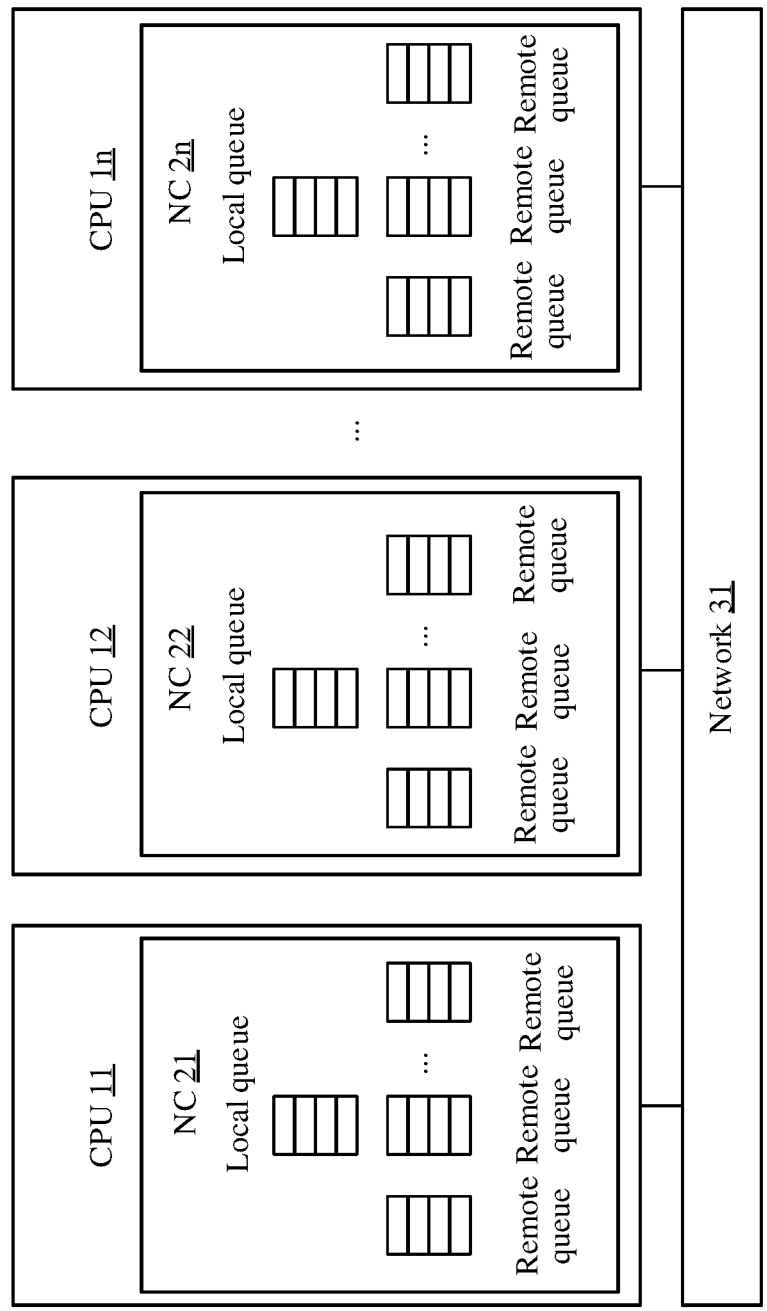
FIG. 4 is a schematic structural diagram of another computing device according to an embodiment of the present application.

Referring to FIG. 4, FIG. 4 is another schematic structural diagram of a computing device according to an embodiment of the present application. A difference between the embodiment of FIG. 4 and the embodiment of FIG. 3 is as follows. An NC in FIG. 4 is a hardware circuit that is integrated into a processor.

In a possible implementation, a storage circuit of each NC stores instruction code, and the NC runs two software modules, a remote agent and a local agent. The local agent is used to perform an operation related to a local queue in the NC. For example, the local agent performs operations such as an enqueue operation, a dequeue operation, and sending a lock request. The remote agent is used to perform an operation related to all remote queues in the NC. For example, the remote agent performs operations such as selecting a remote queue, an enqueue operation, a dequeue operation, generating a migration queue, allocating a lock, and sending a migration queue.

Figure 5A:
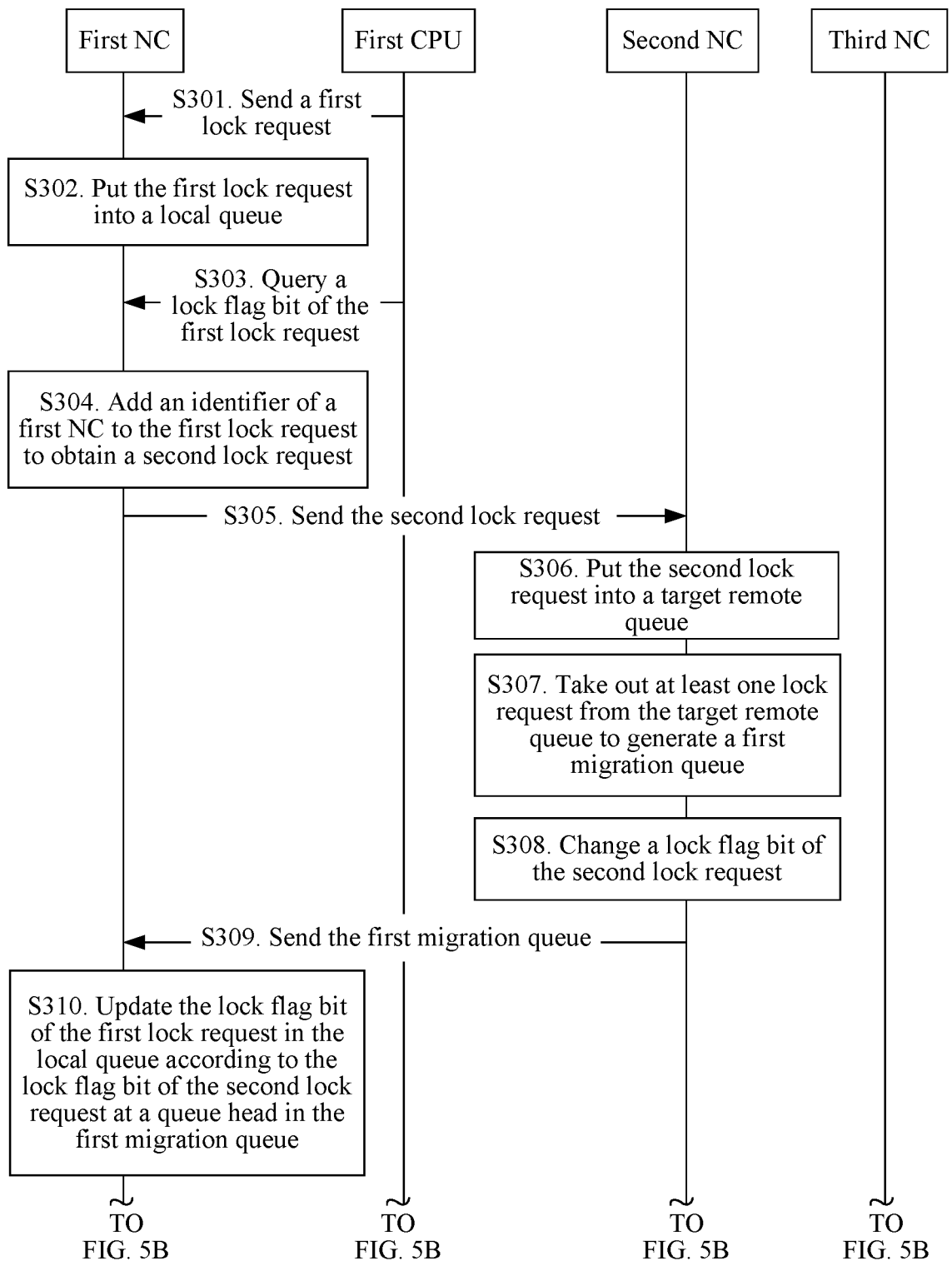
FIG. 5A and FIG. 5B are a schematic flowchart of a lock allocation method according to an embodiment of the present application.
Figure 5B:
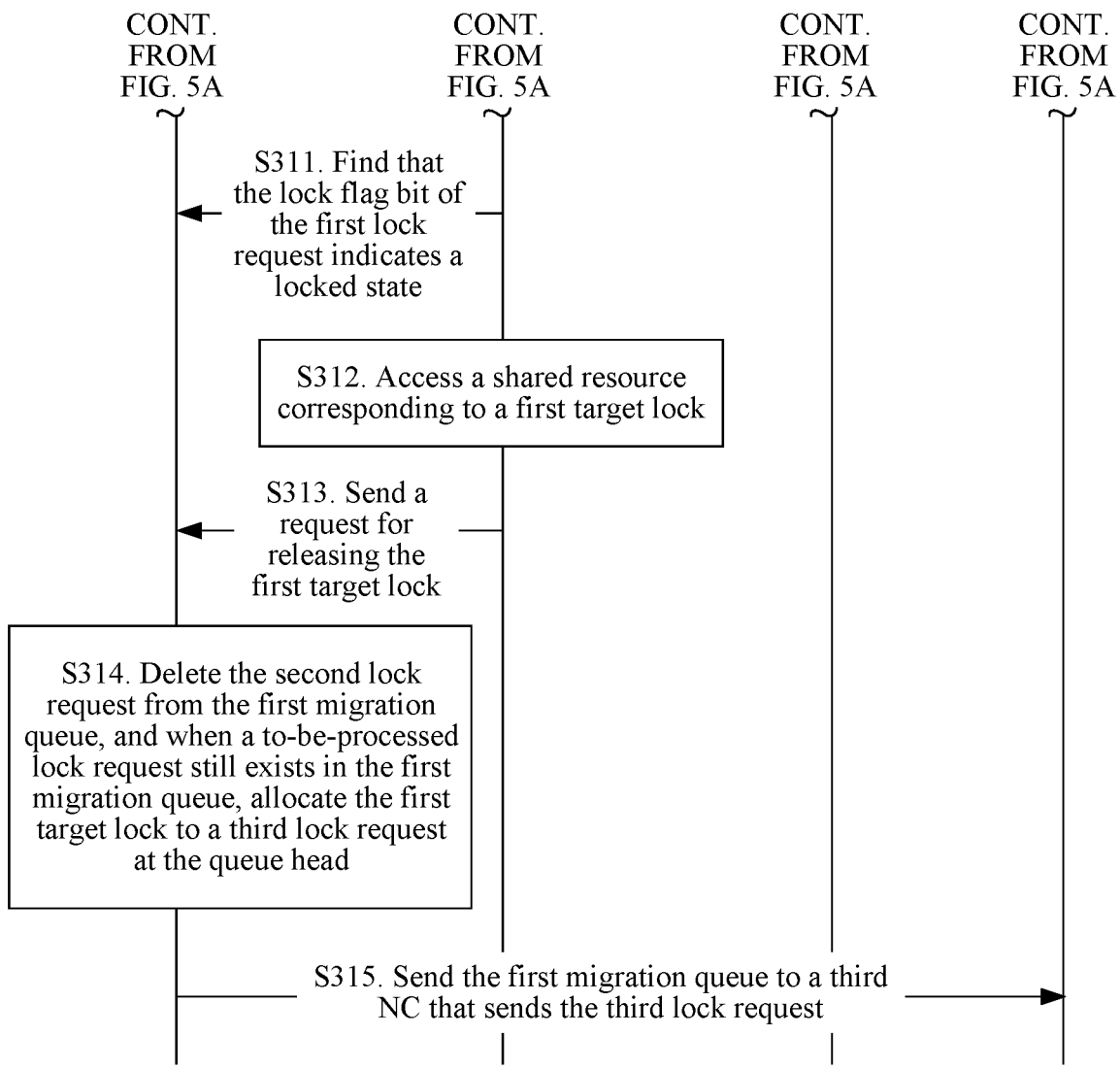

Referring to FIG. 5A and FIG. 5B, FIG. 5A and FIG. 5B are a schematic flowchart of a lock allocation method according to an embodiment of the present application. The lock allocation method shown in FIG. 5A and FIG. 5B are performed by the computing device shown in FIG. 3 or FIG. 4. The lock allocation method includes the following steps.

Step 301. A first CPU sends a first lock request to a first NC.

The first CPU is associated with the first NC, and the first CPU sends the first lock request to the first NC. The first lock request carries a lock address and a lock flag bit. The first lock request is used to request a first target lock, and the first lock request carries the lock flag bit. It may be understood that a value of the lock flag bit carried in the first lock request sent by the first CPU to the first NC indicates an unlocked state.

Step 302. The first NC puts the first lock request into a local queue.

The first NC may put the first lock request into the local queue according to a first in first out sequence, that is, add the first lock request behind a queue tail of the local queue. The first NC may prestore a mapping relationship between an NC and a lock address, and the first NC may determine, according to the mapping relationship, that a second NC manages the first target lock.

Step 303. The first CPU queries a lock flag bit of the first lock request in the local queue of the first NC.

After sending the first lock request, the first CPU queries the lock flag bit of the first lock request in the local queue of the first NC. A query manner may be as follows. The first CPU periodically queries whether the lock flag bit of the first lock request in the local queue of the first NC indicates a locked state. It may be understood that a same CPU may send a plurality of lock requests. When there is a plurality of lock requests in the local queue, the first CPU may periodically query a status of a lock flag bit of each lock request in the local queue in sequence from a queue head of the local queue.

Step 304. The first NC adds an identifier of the first NC to the first lock request to obtain a second lock request.

The first NC replicates the first lock request to generate the second lock request, and the second lock request is a copy of the first lock request. The second lock request further carries the identifier of the NC that generates the second lock request, and the identifier of the NC may be represented using an ID or a name or other information that can uniquely identify the NC.

Step 305. The first NC sends the second lock request to a second NC.

Step 306. The second NC puts the second lock request into a target remote queue, where the target remote queue is a remote queue that is corresponding to a first target lock and that is in at least one remote queue of the second NC.

The second NC prestores a mapping relationship between a lock and a remote queue. The second NC determines, according to the mapping relationship, the target remote queue associated with the first target lock, and the second NC may put the second lock request into the target remote queue according to a first in first out sequence, that is, add the second lock request behind a queue tail of the target remote queue.

Step 307. The second NC takes out at least one lock request from the target remote queue to generate a first migration queue, and the second lock request is located at a queue head of the first migration queue.

The second NC manages the at least one remote queue, each remote queue stores at least one lock request for requesting a same lock, and the second NC selects a remote queue from the at least one remote queue as the target remote queue. The second NC selects the target remote queue in descending order of priorities, in descending order of lock request quantities, according to a random selection method, or in another manner. This is not limited in this embodiment. The second NC takes out a plurality of lock requests from the selected target remote queue. The taken-out lock requests may be all lock requests currently stored in the target remote queue, or may be a preset quantity of lock requests in the front of the target remote queue. This is not limited in this embodiment. The second NC generates the first migration queue according to the taken-out lock requests, and a sorting sequence of the lock requests in the first migration queue is consistent with a sorting sequence of the lock requests in the target remote queue.

For example, an NC 2 includes three remote queues that are respectively a remote queue 11, a remote queue 12, and a remote queue 13, the remote queue 11 is associated with a lock 11, the remote queue 12 is associated with a lock 12, and the remote queue 13 is associated with a lock 13. In an optional implementation, the NC 2 each time selects one target remote queue from the three remote queues in descending order of priorities. Assuming that a priority of the lock 11>a priority of the lock 12>a priority of the lock 13, a sequence in which the NC 2 selects the target remote queue is the remote queue 11, the remote queue 12, the remote queue 13, the remote queue 11, the remote queue 12, the remote queue 13, . . . , and selection is repeated in this sequence.

In another optional implementation, a quantity of the lock request in the remote queue may dynamically change, and the NC 2 each time selects, from the three remote queues, a remote queue in which a quantity of lock requests is the largest as the target remote queue. Assuming that, at a current moment, a quantity of lock requests stored in the remote queue 11 is 5, a quantity of lock requests stored in the remote queue 12 is 4, and a quantity of lock requests stored in the remote queue 13 is 3, the NC 2 determines that the quantity of lock requests in the remote queue 11 is the largest at the current moment, and the NC 2 selects the remote queue 11 from the three remote queues as the target remote queue. In this way, a quantity of lock requests in each remote queue may be balanced in order to prevent an overflow caused by an excessively large quantity of lock requests in a remote queue. If the remote queue 11 is the target remote queue, the NC 2 takes out all the lock requests from the remote queue 11 to generate the first migration queue, a sorting sequence of the lock requests in the first migration queue is consistent with a sorting sequence of the lock requests in the remote queue 11, that is, the lock requests stored in the first migration queue according to a sequence from the queue head to a queue tail are respectively a lock request 111, a lock request 112, a lock request 113, a lock request 114, and a lock request 115.

Step 308. The second NC changes a lock flag bit of the second lock request.

Further, the second NC changes the lock flag bit carried in the second lock request to a specified value, and the specified value indicates a locked state. For example, the lock flag bit is changed to "1", and 1 indicates a locked state.

For example, the lock requests stored in the first migration queue include the lock request 111, the lock request 112, the lock request 113, and the lock request 114, and the lock request 111 is located at a location of the queue head. The NC generating the first migration queue changes a lock flag bit carried in the lock request 111 to "1".

Step 309. The second NC sends the first migration queue to the first NC that sends the second lock request.

Further, the second lock request carries the identifier of the NC that generates the second lock request, and the second NC may determine, according to the identifier of the NC, that the NC sending the second lock request is the first NC.

Step 310. The first NC updates the lock flag bit of the first lock request in the local queue according to the lock flag bit of the second lock request at the queue head in the first migration queue.

The first NC receives the first migration queue sent by the second NC, and each of the at least one lock request in the first migration queue requests a same lock address. The first migration queue is generated by the second NC that manages the first target lock. The first NC obtains the lock address carried in the second lock request at the queue head in the first migration queue, and the first NC allocates the first target lock to the first CPU associated with the first NC. A method for allocating the first target lock may be as follows. The lock flag bit carried in the second lock request at the queue head in the migration queue is changed by the second NC to a lock flag bit indicating a locked state, and the first NC updates the lock flag bit of the first lock request in the local queue according to the status flag bit of the second lock request. The second lock request is obtained by replicating the first lock request.

Step 311. The first CPU queries, in the local queue of the first NC, whether a lock flag bit of a third lock request indicates a locked state.

In step 310, the first NC changes the lock flag bit of the first lock request to a lock flag bit indicating a locked state. Therefore, the first CPU may find, in the local queue of the first NC, that the lock flag bit of the first lock request is updated to a lock flag bit indicating a locked state, that is, the first CPU obtains the first target lock.

For example, the first migration queue includes a lock request 1', a lock request 2', and a lock request 3'. A sorting sequence of the lock requests in the first migration queue from the queue head to the queue tail is the lock request 1', the lock request 2', and the lock request 3'. The lock request 1' is a lock request at the queue head. If lock addresses carried in the lock request 1', the lock request 2', and the lock request 3' are "0xffff", a lock flag bit carried in the lock request 1' is "1", and lock flag bits carried in the lock request 2' and the lock request 3' are "0", where a lock flag bit "0" indicates an unlocked state, and a lock flag bit "1" indicates a locked state, the first NC updates a lock flag bit of a lock request 1 stored in the local queue to "1" according to the lock flag bit "1" of the lock request 1', where the lock request 1' is obtained by replicating the lock request 1. The first CPU is a CPU associated with the first NC. After sending the lock request 1, the first CPU periodically queries the lock flag bit of the lock request 1 in the local queue of the first NC. When finding that the lock flag bit of the lock request 1 is "1", the first CPU determines that the first target lock indicated by the lock address "0xffff" may be used by the first CPU, and the first CPU obtains the first target lock such that the first CPU can access a shared resource corresponding to the first target lock.

In a possible implementation, the first NC receives the first migration queue, and when the lock flag bit of the first lock request at the queue head in the first migration queue indicates a locked state, the first NC instructs the first CPU to obtain the first target lock such that the first CPU can access the shared resource corresponding to the first target lock.

Step 312. The first CPU accesses a shared resource corresponding to the first target lock.

Step 313. The first CPU sends, to the first NC, a request for releasing the first target lock.

After completing the access to the shared resource corresponding to the first target lock, the first CPU sends, to the first NC, the request for releasing the first target lock, to notify the first NC that the first target lock is released.

Step 314. The first NC deletes the second lock request from the first migration queue. If a to-be-processed lock request still exists in the first migration queue, the first NC allocates the first target lock to the third lock request at the queue head.

After receiving the request that is for releasing the first target lock and that is sent by the first CPU, the first NC deletes the second lock request from the first migration queue. In this case, when the to-be-processed lock request still exists in the first migration queue, a lock request following the second lock request is a lock request at the queue head in the first migration queue at a current moment. For ease of subsequent description, the lock request following the second lock request in the first migration queue is denoted by the third lock request. The first NC determines whether the current first migration queue is an empty queue, that is, whether the to-be-processed lock request exists in the first migration queue. If the to-be-processed lock request exists in the first migration queue, the first NC allocates the first target lock to the third lock request at the queue head in the first migration queue at the current moment. The allocation method may be as follows. The first NC changes the lock flag bit carried in the third lock request to a lock flag bit indicating a locked state.

In the example of step 311, when the first CPU completes the access to the shared resource corresponding to the first target lock, the first CPU releases the lock and sends, to the first NC, the request for releasing the first target lock. The first NC receives the message that is for releasing the first target lock and that is sent by the first CPU, and deletes the lock request 1' from the first migration queue. The first migration queue from which the lock request 1' is deleted includes the lock request 2' and the lock request 3', and the lock request 2' is a lock request at the queue head in the current first migration queue. The first NC determines that the current first migration queue is not an empty queue, and changes the lock flag bit carried in the lock request 2' to "1".

Step 315. The first NC sends the first migration queue to a third NC that sends the third lock request.

Each lock request may carry an identifier of an NC that sends the lock request. The first NC may determine, according to the identifier of the NC (for example, an ID of the NC) carried in the third lock request, the third NC that sends the third lock request.

In a possible implementation of this application, in FIG. 5A and FIG. 5B, the first NC may also perform a step of generating a migration queue. For a specific process of generating the migration queue by the first NC, refer to descriptions of steps 306 to 309. A process in which the first NC receives the migration queue and processes the lock request in the migration queue and a process in which the first NC generates the migration queue may be two separate processes. The first NC may perform the foregoing two processes in parallel. Alternatively, the first NC may receive the migration queue and process the lock request in the migration queue, and then select a target remote queue and generate the migration queue. Alternatively, the first NC may select a target remote queue and generate the migration queue, and then receive a migration queue sent by another NC and process a lock request in the migration queue. A condition for generating the migration queue by the first NC is not limited in this embodiment. For example, when a quantity of lock requests in a remote queue reaches a preset value, the first NC may take out the lock request in the remote queue to generate the migration queue. For another example, the first NC takes out a lock request in a remote queue from a plurality of remote queues according to an instruction of a scheduling instruction sent by the associated CPU, to generate the migration queue. For another example, the first NC each time selects a remote queue from a plurality of remote queues in descending order of priorities, and takes out a lock request from the selected remote queue to generate the migration queue. Alternatively, the first NC generates the migration queue in another manner. This is not limited in this embodiment.

In a possible implementation of the present application, the second NC may store a lock request using a queue, or may store a lock request using a stack. The lock request in the stack is processed according to a first in last out sequence.

During implementation of the foregoing embodiment, an NC receives a migration queue that includes a plurality of lock requests for requesting a same lock, a sorting sequence of the lock requests in the migration queue is the same as a sequence in which an NC managing the lock receives a lock request sent by each CPU, and the NC allocates, to an associated CPU, the lock requested by a lock request at a queue head in the migration queue. In a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock. Further, after receiving a request that is for releasing the lock and that is sent by the CPU, the NC deletes the lock request at the queue head in the migration queue, changes a lock flag bit of a lock request at the queue head in the migration queue at a current moment, and sends the migration queue to an NC corresponding to the lock request at the queue head in the migration queue at the current moment in order to avoid a problem that a plurality of request messages are produced because after the lock is returned to the NC that manages the lock, another NC requesting the same lock requests the lock again from the NC that manages the lock, thereby reducing a quantity of request messages. Furthermore, in a process in which an NC obtains a lock, the lock is allocated, in sequence using a migration queue, to each CPU that requests the lock, and whether the lock is in a locked state is recorded using a lock flag bit in the migration queue of an NC. In the process of obtaining the lock, the CPU does not need to access a memory and a cache that are associated with the CPU in order to avoid a problem that storage bandwidth is consumed because the CPU needs to access, in a process of determining whether use of a shared resource is completed, the cache or the memory that are associated with the CPU.

Figure 6:
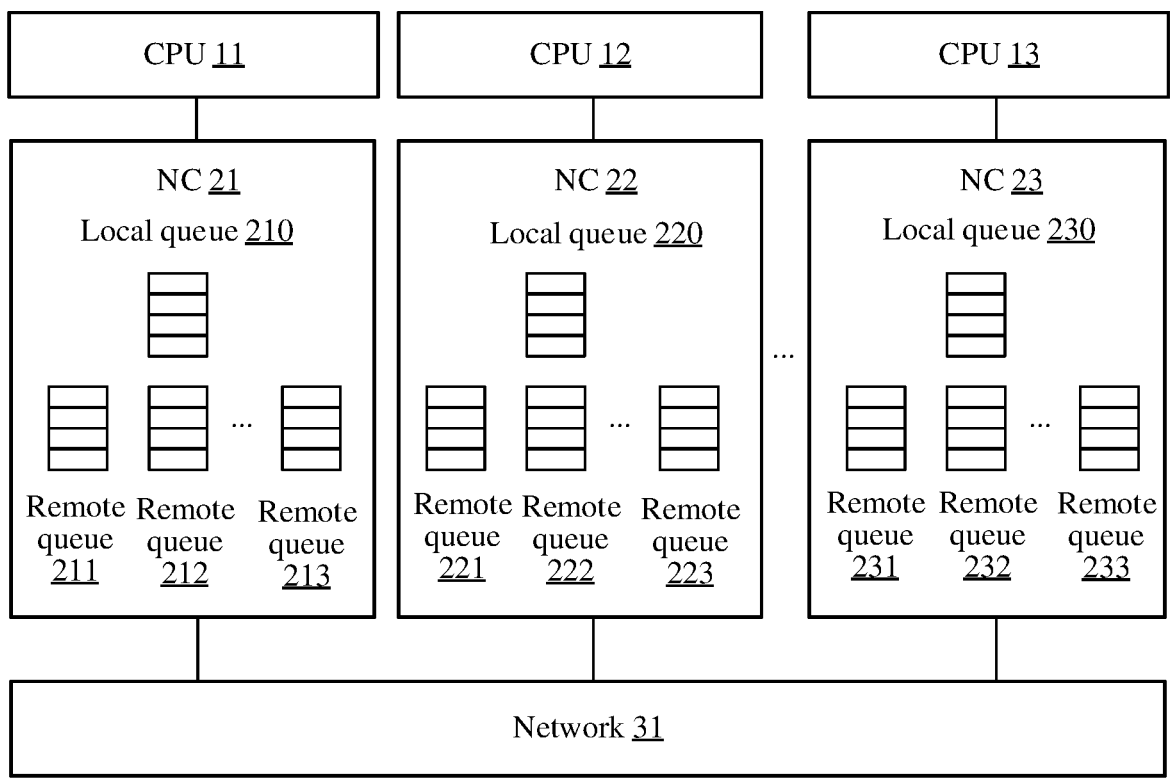
FIG. 6 is a schematic structural diagram of another computing device according to an embodiment of the present application.
Figure 7A:
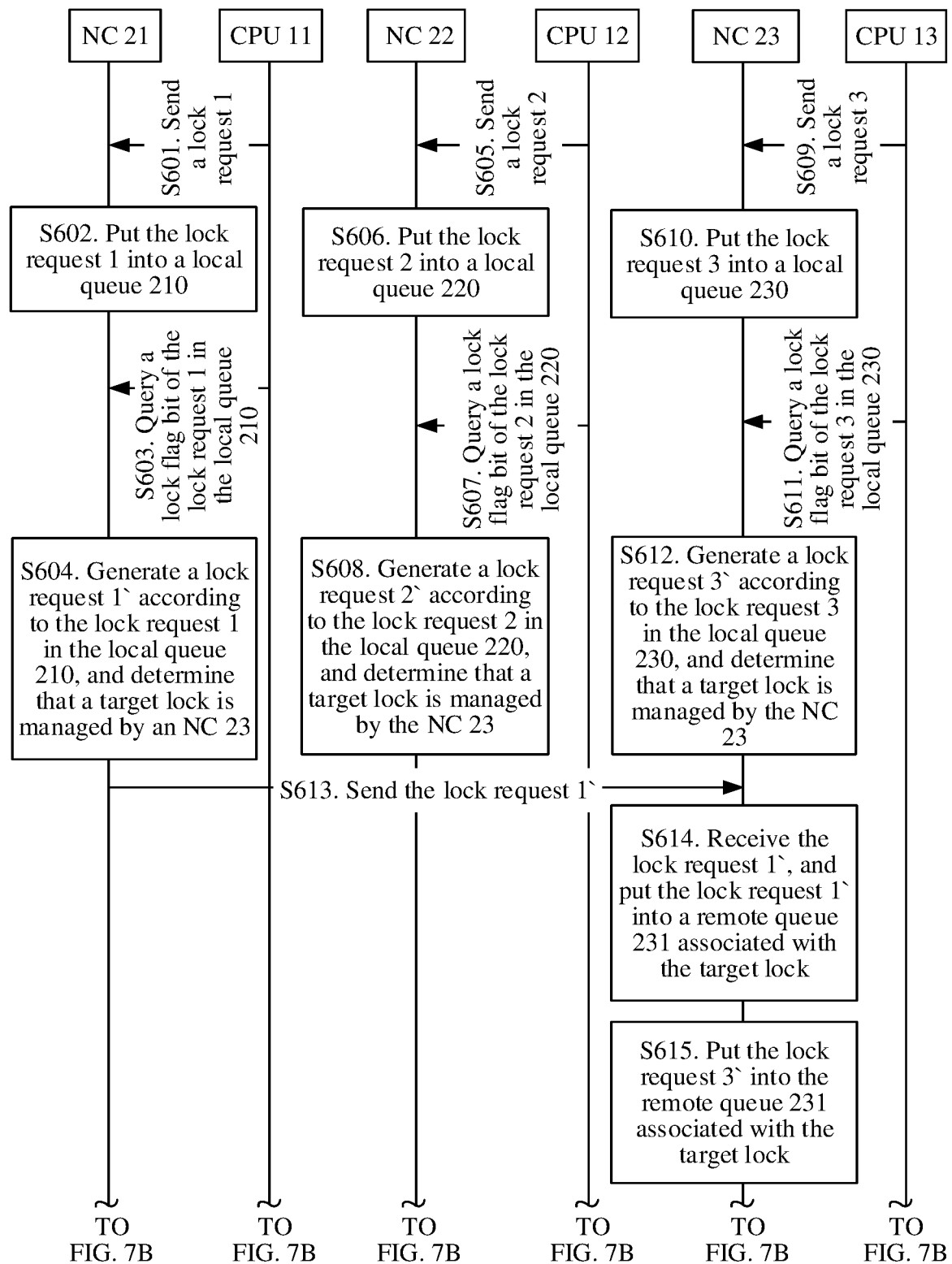
FIG. 7A, FIG. 7B, FIG. 8A, and FIG. 8B are a schematic flowchart of another lock allocation method according to an embodiment of the present application.
Figure 7B:
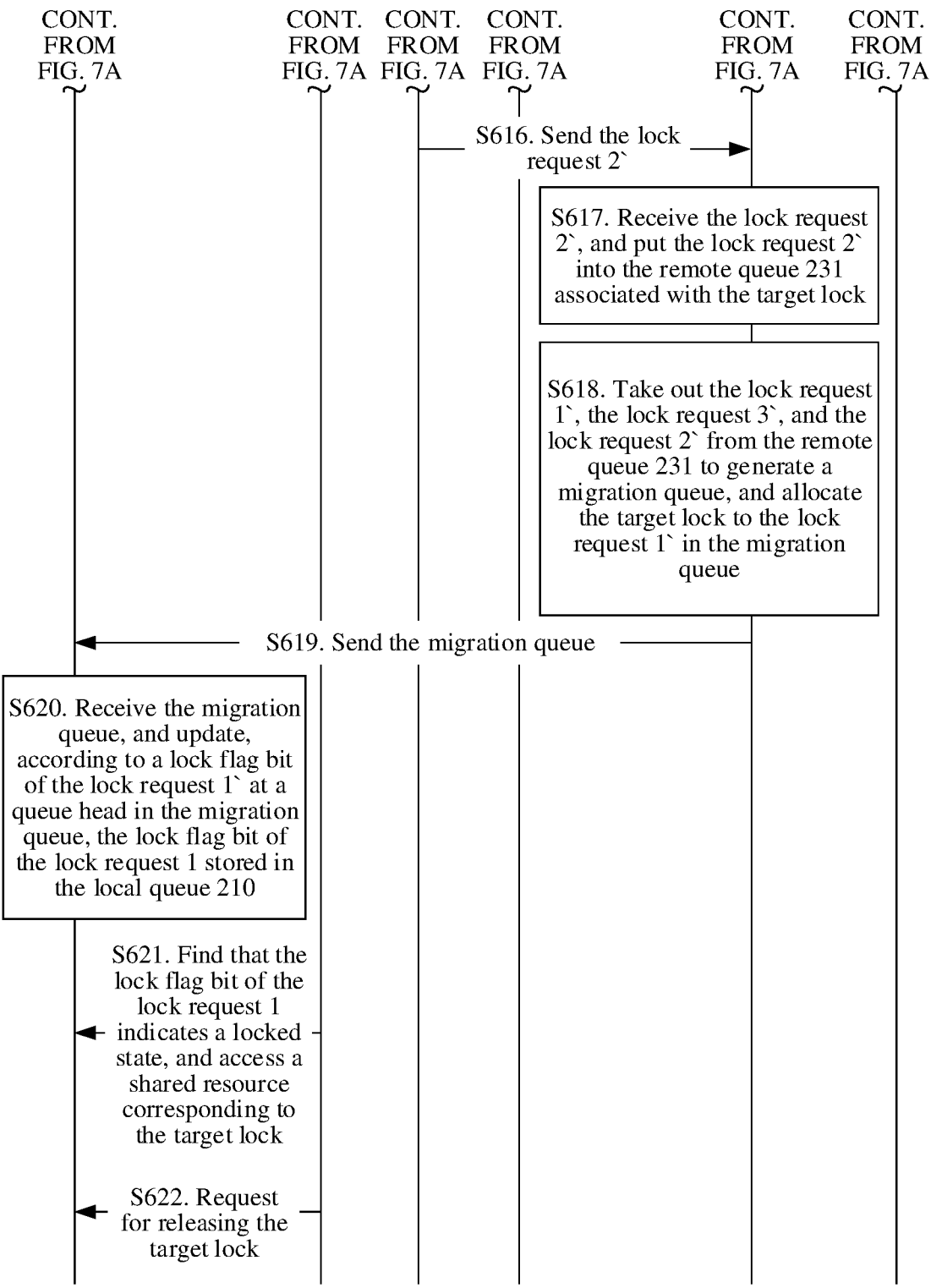
Figure 8A:
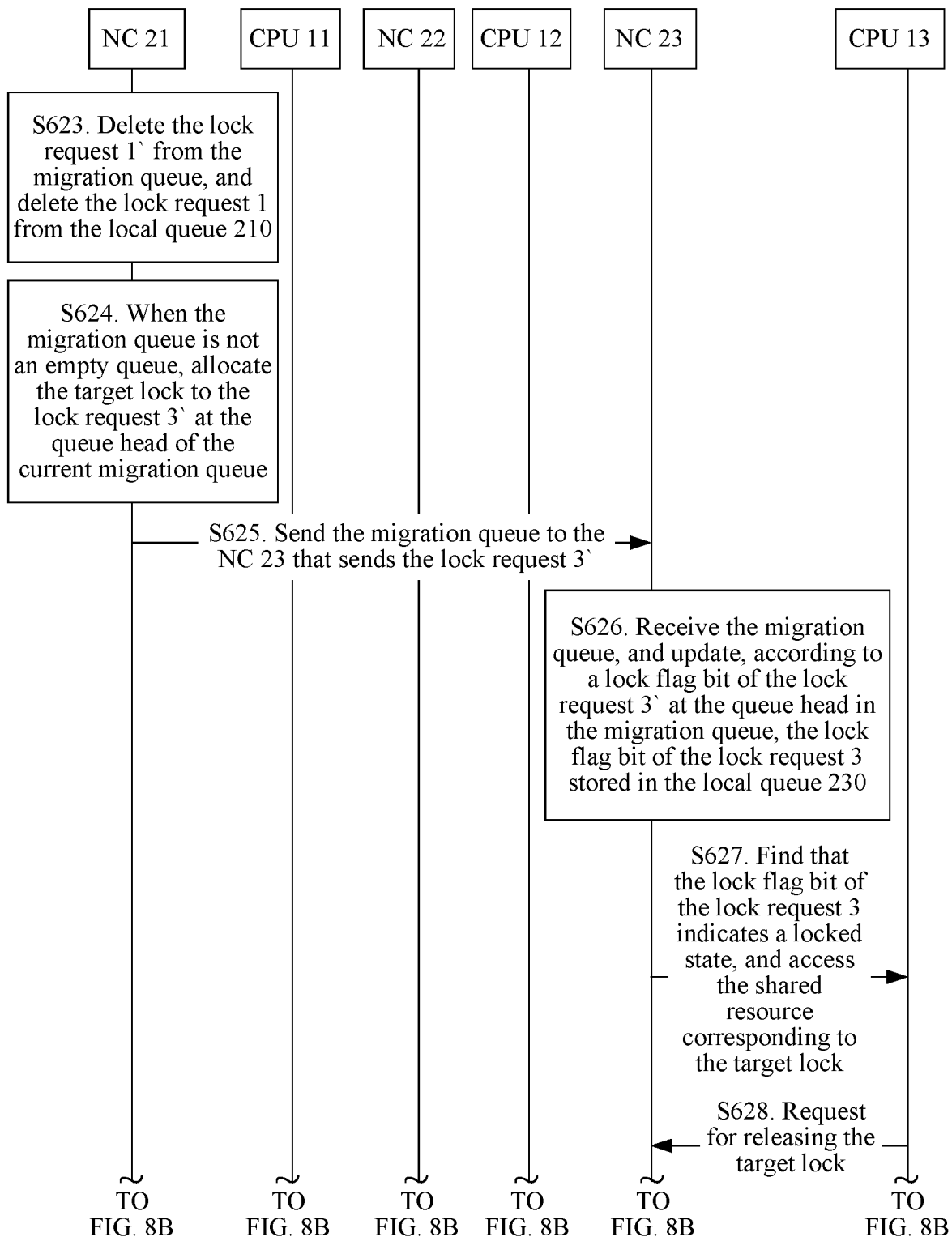
Figure 8B:
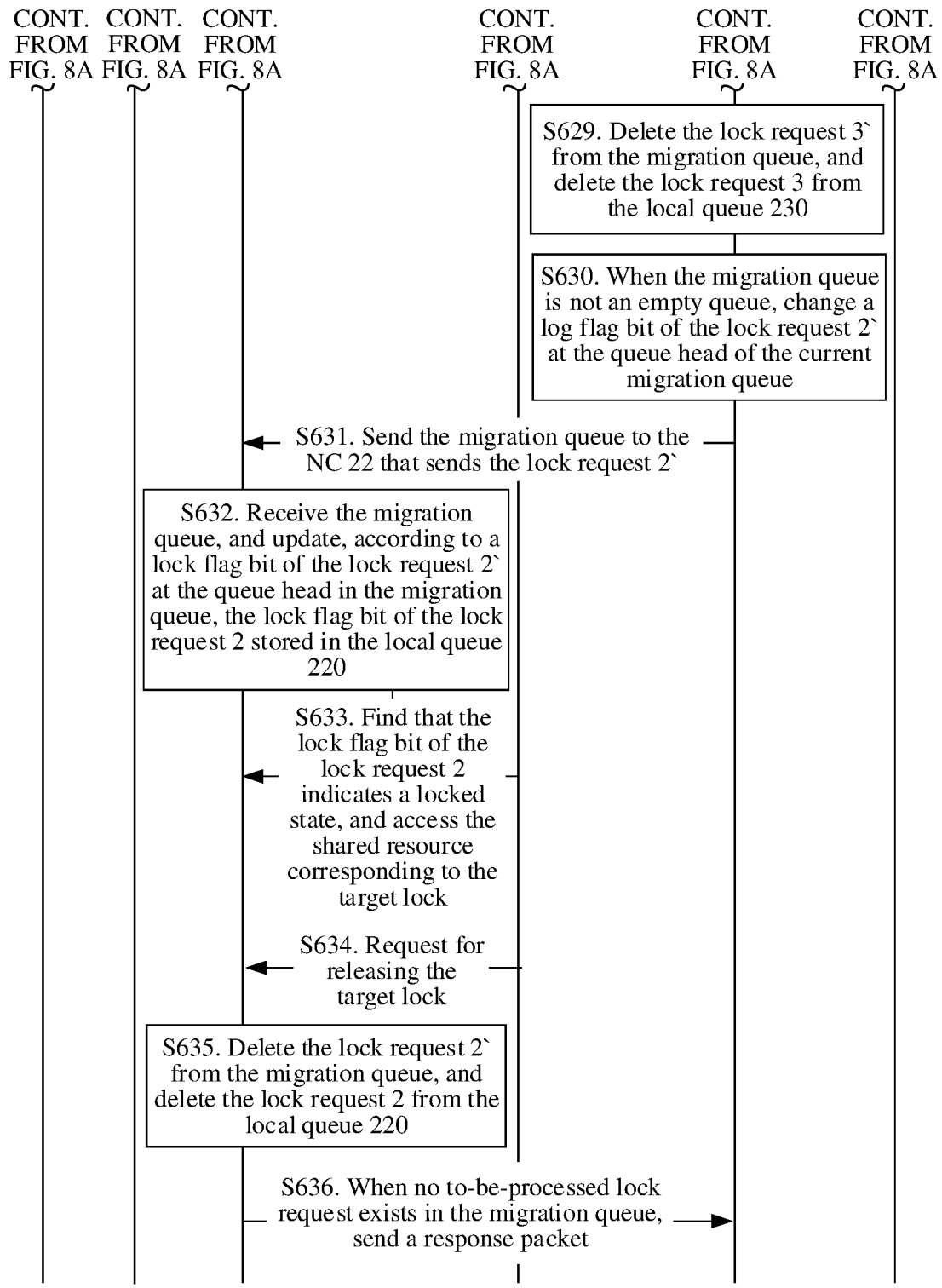

Next, the foregoing allocation method is further described in detail with reference to FIG. 6 to FIG. 8A and FIG. 8B. Referring to FIG. 6, FIG. 6 is a schematic structural diagram of a computing device according to an embodiment of the present application. In this embodiment of the present application, the computing device includes three CPUs and three NCs. The three CPUs are a CPU 11, a CPU 12, and a CPU 13. The three NCs are an NC 21, an NC 22, and an NC 23. The CPU 11 and the NC 21 are connected using a bus. The CPU 12 and the NC 22 are connected using a bus. The CPU 13 and the NC 23 are connected using a bus. The bus between a CPU and an associated NC includes but is not limited to a PCIE bus, a universal serial bus (USB) bus, a QPI or an HT bus. The NC 21, the NC 22, and the NC 23 are connected using a network 31, and the network 31 includes but is not limited to a QPI network and an HT network. The NC 21 includes a local queue 210, a remote queue 211, a remote queue 212, and a remote queue 213, and each remote queue is associated with a lock. The NC 22 includes a local queue 220, a remote queue 221, a remote queue 222, and a remote queue 223, and each remote queue is associated with a lock. The NC 23 includes a local queue 230, a remote queue 231, a remote queue 232, and a remote queue 233, and each remote queue is associated with a lock.

Referring to FIG. 7A, FIG. 7B, FIG. 8A, and FIG. 8B, a schematic flowchart of a lock allocation method according to an embodiment of the present application is described based on the schematic structural diagram of the computing device in FIG. 6 with reference to FIG. 6 using an example.

Step 601. A CPU 11 sends a lock request 1 to an NC 21.

The CPU 11 is associated with the NC 21, and the CPU 11 sends the lock request 1 to the NC 21. The lock request 1 carries a lock address and a lock flag bit. It may be understood that, in this case, the lock flag bit carried in the lock request 1 sent by the CPU 11 indicates an unlocked state.

Step 602. The NC 21 puts the lock request 1 into a local queue 210.

The NC 21 receives the lock request 1 sent by the CPU 11, and the NC 21 puts the lock request 1 into the local queue 210 according to a first in first out sequence, that is, the NC 21 puts the lock request 1 at a queue tail of the local queue 210.

Step 603. The CPU 11 queries a lock flag bit of the lock request 1 in the local queue 210.

After the CPU 11 sends the lock request 1, the CPU 11 may query the lock flag bit of the lock request 1 in the local queue 210 of the NC 21. When a value of the lock flag bit indicates a locked state, the CPU 11 obtains a target lock.

Optionally, after receiving the lock request 1, the NC 21 notifies the CPU 11 of a location of the lock request 1 in the local queue 210 such that the CPU 11 queries the lock flag bit of the lock request 1 in the local queue 210 according to the notified location.

Step 604. The NC 21 generates a lock request 1' according to the lock request 1 in the local queue 210, and determines that a target lock is managed by an NC 23.

The NC 21 may process a lock request in the local queue 210 according to a first in first out sequence. When the lock request 1 is a lock request at a queue head in the local queue 210 at a current moment, the NC 21 generates the lock request 1' according to the lock request 1. The lock request 1' is a copy of the lock request 1, and the lock request 1' further carries identifier information of the NC 21. The identifier information may be an ID of the NC 21 or other information that can uniquely identify the NC. The NC 21 prestores a mapping relationship between a lock address and an NC identifier. Each NC identifier may be associated with a plurality of lock addresses. It is assumed that the NC 21 determines, according to the mapping relationship, that the target lock requested by the lock request 1 is associated with the NC 23.

Step 605. A CPU 12 sends a lock request 2 to an NC 22.

The CPU 12 is associated with the NC 22, and the CPU 12 may send the lock request 2 to the NC 22 using a bus. The lock request 2 carries a lock address and a lock flag bit. The lock address indicates an address of a target lock, and the lock flag bit indicates whether the CPU 12 sending the lock request 2 obtains the target lock. Different values of the lock flag bit may indicate different lock states. For example, a value "1" of the lock flag bit indicates a locked state, and a value "0" of the lock flag bit indicates an unlocked state. It may be understood that a value of the lock flag bit carried in the lock request 2 sent by the CPU 12 indicates an unlocked state.

Step 606. The NC 22 puts the lock request 2 into a local queue 220.

The NC 22 receives the lock request 2, and puts the lock request 2 at a queue tail of the local queue 220 according to a first in first out sequence. In addition, the NC 22 stores the lock flag bit of the lock request 2 at a specified location. In this case, because the CPU 12 sending the lock request 2 does not obtain the target lock, the value of the lock flag bit of the lock request 2 stored in the local queue 220 indicates an unlocked state. The NC 22 may notify the CPU 12 of a location of the lock request 2 in the local queue 220 such that the CPU 12 queries the lock flag bit of the lock request 2 in the local queue 220 according to the notified location.

Step 607. The CPU 12 queries a lock flag bit of the lock request 2 in the local queue 220.

After the CPU 12 sends the lock request 2, the CPU 12 queries the value of the lock flag bit of the lock request 2 in the local queue 220 of the NC 22. For example, the CPU 12 queries the lock flag bit of the lock request 2 at a queue head of the local queue 220. When the CPU 12 finds that the value of the lock flag bit of the lock request 2 indicates a locked state, it indicates that the CPU 12 obtains the target lock.

Step 608. The NC 22 generates a lock request 2' according to the lock request 2 in the local queue 220, and determines that a target lock is managed by the NC 23.

The NC 22 may process a lock request in the local queue 220 according to a first in first out sequence. When the lock request 2 needs to be processed, the NC 22 generates the lock request 2' according to the lock request 2. The lock request 2' is a copy of the lock request 2, and the lock request 2' further carries identifier information of the NC 22. The identifier information may be an ID of the NC 22 or other information that can uniquely identify the NC. The NC 22 may prestore a mapping relationship between a lock address and an NC identifier, and the NC 22 determines, according to the mapping relationship, that the target lock requested by the lock request 2 is managed by the NC 23.

Step 609. A CPU 13 sends a lock request 3 to the NC 23.

The CPU 13 is associated with the NC 23, and the CPU 13 sends the lock request 3 to the NC 23. The lock request 3 carries a lock address and a lock flag bit. The lock address indicates a lock address of a target lock, and the lock flag bit indicates whether the CPU 13 sending the lock request 3 obtains the target lock. A value of the lock flag bit is used to indicate a locked state or an unlocked state. For example, a value "1" of the lock flag bit indicates a locked state, and a value "0" of the lock flag bit indicates an unlocked state. It may be understood that the value of the lock flag bit carried in the lock request 3 sent by the CPU 13 to the NC 23 indicates an unlocked state.

In this embodiment of the present application, it is assumed that the lock request 1, the lock request 2, and the lock request 3 carry a same lock address, that is, the foregoing three lock requests are used for requesting a same lock. In another application scenario, lock requests sent by CPUs may carry different lock addresses.

Step 610. The NC 23 puts the lock request 3 into a local queue 230.

The NC 23 receives the lock request 3, and the NC 23 may put the lock request 3 into the local queue 230 according to a first in first out sequence, that is, the NC 23 puts the lock request 3 at a queue tail of the local queue 230.

Step 611. The CPU 13 queries a lock flag bit of the lock request 3 in the local queue 230.

After the CPU 13 sends the lock request 3, the CPU 13 queries the lock flag bit of the lock request 3 in the local queue 230 of the NC 23. For example, the CPU 13 queries the lock flag bit of the lock request 3 at a queue head of the local queue 230. When finding that the lock flag bit indicates a locked state, the CPU 13 obtains the target lock.

Step 612. The NC 23 generates a lock request 3' according to the lock request 3 in the local queue 230, and determines that a target lock is managed by the NC 23.

The NC 23 may process a lock request in the local queue 230 according to a first in first out sequence. When the lock request 3 needs to be processed, for example, when the lock request 3 is the queue head of the local queue 230, the NC 23 generates the lock request 3' according to the lock request 3. The lock request 3' is obtained by replicating the lock request 3, and the lock request 3' carries identifier information of the NC 23. The identifier information may be an ID of the NC 23 or other information that can uniquely identify the NC. The NC 23 may prestore a mapping relationship between a lock address and an NC identifier. It is assumed that the NC 23 determines, according to the mapping relationship, that the lock address carried in the lock request 3 is associated with the NC 23.

It should be noted that a sequence of steps 601 to 604, steps 605 to 608, and steps 609 to 612 is not limited, and the steps may be performed in parallel, or may be performed in any sequence.

Step S613. The NC 21 sends the lock request 1' to the NC 23.

The NC 21 stores a mapping relationship between a lock address and an NC that manages a lock. Assuming that the NC 21 determines, according to the mapping relationship, that the target lock requested by the lock request 1' generated by the NC 21 is managed by the NC 23, the NC 21 sends the lock request 1' to the NC 23.

Step 614. The NC 23 receives the lock request 1', and puts the lock request 1' into a remote queue 231 associated with the target lock.

The NC 23 prestores a mapping relationship between a lock address and an identifier of a remote queue. Assuming that the NC 23 determines, according to the mapping relationship, that the lock address carried in the lock request 1' is associated with the remote queue 231 in the NC 23, the NC 23 may put the lock request 1' into the remote queue 231 according to a first in first out sequence.

Step 615. The NC 23 puts the lock request 3' into the remote queue 231 associated with the target lock.

The NC 23 includes a plurality of remote queues, and each remote queue is associated with a lock. The NC 23 may store a mapping relationship between a lock address and a queue identifier. Assuming that the NC 23 determines, according to the mapping relationship between the lock address and the queue identifier, that the target lock is associated with the remote queue 231, the NC 23 puts the lock request 3' into the remote queue 231 according to a first in first out sequence.

The lock request 1' and the lock request 3' in steps 614 and 615 may be stored in the remote queue 231 according to a time sequence of receiving the lock request messages by the NC 23. In this embodiment, it is assumed that step 614 is performed before step 615.

Step 616. The NC 22 sends the lock request 2' to the NC 23.

The NC 22 stores a mapping relationship between a lock address and an NC that manages a lock. Assuming that the NC 22 determines, according to the mapping relationship, that the target lock requested by the lock request 2' is associated with the NC 23, the NC 22 sends the lock request 2' to the NC 23.

Step 617. The NC 23 receives the lock request 2', and puts the lock request 2' into the remote queue 231 associated with the target lock.

The NC 23 includes a plurality of remote queues, and each remote queue is associated with a lock. The NC 23 prestores a mapping relationship between a lock address and an identifier of a remote queue. Assuming that the NC 23 determines, according to the mapping relationship, that the lock address carried in the lock request 2' is associated with the remote queue 231, the NC 23 puts the lock request 2' into the remote queue 231 according to a first in first out sequence.

Step 618. The NC 23 takes out the lock request 1', the lock request 3', and the lock request 2' from the remote queue 231 to generate a migration queue, and allocates the target lock to the lock request 1' in the migration queue.

It is assumed that the remote queue 231 of the NC 23 is an empty queue before the lock request 1', the lock request 3', and the lock request 2' are put into the remote queue 231, and a sorting sequence of the lock requests in the migration queue is consistent with a sorting sequence of the lock requests in the remote queue 231, that is, the lock requests in the migration queue from a queue head to a queue tail are the lock request 1', the lock request 3', and the lock request 2' in sequence. The NC 23 allocates the target lock to a lock request at the queue head in the migration queue, that is, the lock request 1'. The NC 23 may allocate the target lock to the lock request 1' using the following method of changing a lock flag bit of the lock request 1' in the migration queue to a lock flag bit indicating a locked state. The migration queue generated by the NC 23 may be stored in a storage unit or another area of the NC. This is not limited in this embodiment.

The NC 23 may determine, according to a unique identifier carried in the lock request 1' at the queue head in the migration queue, that an NC sending the lock request is the NC 21, and the NC 23 sends the migration queue to the NC 21.

Step 619. The NC 23 sends the migration queue to the NC 21.

When the lock request at the queue head in the migration queue is the lock request 3', the NC 23 does not need to send the migration queue to another NC, and the NC 23 directly takes out the lock request 3' from the migration queue, and then updates the lock flag bit of the lock request 3 in the local queue 230 according to a lock flag bit of the lock request 3'.

Step 620. The NC 21 receives the migration queue, and updates, according to a lock flag bit of the lock request 1' at a queue head in the migration queue, the lock flag bit of the lock request 1 stored in the local queue 210.

The NC 21 determines the lock request 1' at the queue head in the migration queue. In this case, the lock flag bit of the lock request 1' indicates a locked state. The NC 21 updates, according to the lock flag bit of the lock request 1', the lock flag bit of the lock request 1 stored in the local queue 210. The updated lock flag bit of the lock request 1 in the local queue 210 also indicates a locked state. The migration queue received by the NC 21 may be stored in a register, a buffer, or another area of the NC. This is not limited in this embodiment.

Step 621. The CPU 11 finds that the lock flag bit of the lock request 1 indicates a locked state, and accesses a shared resource corresponding to the target lock.

Step 622. After completing the access to the shared resource corresponding to the target lock, the CPU 11 sends, to the NC 21, a request for releasing the target lock.

Step 623. After receiving the request that is for releasing the target lock and that is sent by the CPU 11, the NC 21 deletes the lock request 1' from the migration queue, and deletes the lock request 1 from the local queue 210.

After the lock request 1' is deleted from the migration queue, the migration queue includes the lock request 3' and the lock request 2', and the lock request 3' is the queue head of the migration queue at a current moment.

It should be noted that records of a lock request message and a lock flag bit that are stored in a local queue are mainly used by a CPU requesting a shared resource to determine whether the shared resource can be accessed. After the lock request stored in the local queue is processed, that is, after an NC receives a request that is for releasing a target lock and that is sent by the CPU, the NC deletes the lock request from the local queue to releases storage space such that another newly added lock request can be normally stored in the local queue.

Step 624. When the migration queue is not an empty queue, the NC 21 allocates the target lock to the lock request 3' at the queue head of the current migration queue.

The NC 21 determines whether the migration queue is an empty queue, that is, whether a to-be-processed lock request exists in the migration queue. According to a result of Step 623, the migration queue includes the lock request 3' and the lock request 2'. The NC 21 determines that a lock request at the queue head in the migration queue is the lock request 3'. The NC 21 may determine, according to a source NC identifier (for example, the ID of the NC) carried in the lock request 3', that an NC sending the lock request 3' is the NC 23.

Step 625. The NC 21 sends the migration queue to the NC 23 that sends the lock request 3'.

Step 626. The NC 23 receives the migration queue, and updates, according to a lock flag bit of the lock request 3' at the queue head in the migration queue, the lock flag bit of the lock request 3 stored in the local queue 230.

Optionally, the NC 23 determines the lock request 3' at the queue head in the migration queue. In this case, the lock flag bit of the lock request 3' indicates a locked state. The NC 23 updates, according to the lock flag bit of the lock request 3', the lock flag bit of the lock request 3 stored in the local queue 230. The updated lock flag bit of the lock request 3 in the local queue 230 also indicates a locked state.

Step 627. The CPU 13 finds, in the local queue 230, that the lock flag bit of the lock request 3 indicates a locked state, and the CPU 113 obtains the target lock, and accesses the shared resource corresponding to the target lock.

Step 628. After completing the access to the shared resource, the CPU 13 sends, to the NC 23, a request for releasing the target lock.

Step 629. After receiving the request for releasing the target lock, the NC 23 deletes the lock request 3' from the migration queue, and deletes the lock request 3 from the local queue 230.

After the lock request 3' is deleted from the migration queue, the migration queue includes only the lock request 2', and the lock request 2' is the queue head of the migration queue at a current moment.

Step 630. When the migration queue is not an empty queue, the NC 23 changes a lock flag bit of the lock request 2' at the queue head of the current migration queue.

The NC 23 determines whether the migration queue is an empty queue, that is, whether a to-be-processed lock request exists in the migration queue. According to a result of Step 629, the migration queue includes the lock request 2'. The NC 23 determines that a lock request at the queue head in the migration queue is the lock request 2'. The NC 23 may determine, according to a source NC identifier (for example, the ID of the NC) carried in the lock request 2', that an NC sending the lock request 2' is the NC 22.

Step 631. The NC 23 sends the migration queue to the NC 22 that sends the lock request 2'.

Step 632. The NC 22 receives the migration queue, and updates, according to the lock flag bit of the lock request 2' at the queue head in the migration queue, the lock flag bit of the lock request 2 stored in the local queue 220.

Optionally, the NC 22 determines the lock request 2' at the queue head in the migration queue. In this case, the lock flag bit of the lock request 2' indicates a locked state. The NC 22 updates, according to the lock flag bit of the lock request 2', the lock flag bit of the lock request 2 stored in the local queue 220. The updated lock flag bit of the lock request 2 in the local queue 220 also indicates a locked state.

Step 633. The CPU 12 finds that the lock flag bit of the lock request 2 indicates a locked state, and accesses the shared resource corresponding to the target lock.

Step 634. After completing the access to the shared resource, the CPU 12 sends, to the NC 22, a request for releasing the target lock.

Step 635. The NC 22 deletes the lock request 2' from the migration queue, and deletes the lock request 2 from the local queue 220.

After the lock request 2' is deleted from the migration queue, no to-be-processed lock request exists in the migration queue.

Step 636. When no to-be-processed lock request exists in the migration queue, the NC 22 sends a response packet to the NC 23. The NC 23 is an NC that manages the target lock.

The NC 22 sends the response packet to the NC 23 associated with the target lock, to notify the NC 23 that processing of the lock requests in the migration queue is completed. The NC 23 may select a plurality of lock requests from a remote queue according to a preset rule to generate a new migration queue, and process the migration queue according to a procedure of steps 618 to 637.

During implementation of this embodiment of this application, an NC receives a migration queue that includes a plurality of lock requests for requesting a same lock, a sorting sequence of the lock requests in the migration queue is the same as a sequence in which an NC managing the lock receives a lock request sent by each CPU, and the NC allocates, to an associated CPU, the lock requested by a lock request at a queue head in the migration queue. In a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock. Further, after receiving a request that is for releasing the lock and that is sent by the CPU, the NC deletes the lock request at the queue head in the migration queue, changes a lock flag bit of a lock request at the queue head in the migration queue at a current moment, and sends the migration queue to an NC corresponding to the lock request at the queue head in the migration queue at the current moment in order to avoid a problem that a plurality of request messages are produced because after the lock is returned to the NC that manages the lock, another NC requesting the same lock requests the lock again from the NC that manages the lock, thereby reducing a quantity of request messages. Furthermore, in a process in which an NC obtains a lock, the lock is allocated, in sequence using a migration queue, to each CPU that requests the lock, and whether the lock is in a locked state is recorded using a lock flag bit in the migration queue of an NC. In the process of obtaining the lock, the CPU does not need to access a memory and a cache that are associated with the CPU in order to avoid a problem that storage bandwidth is consumed because the CPU needs to access, in a process of determining whether use of a shared resource is completed, the cache or the memory that are associated with the CPU.

The lock allocation methods provided in the embodiments of the present application are described in detail above with reference to FIG. 3 to FIG. 8A and FIG. 8B, and a lock allocation apparatus and a computing device provided in the embodiments of the present application are described below with reference to FIG. 9 and FIG. 10.

Figure 9:
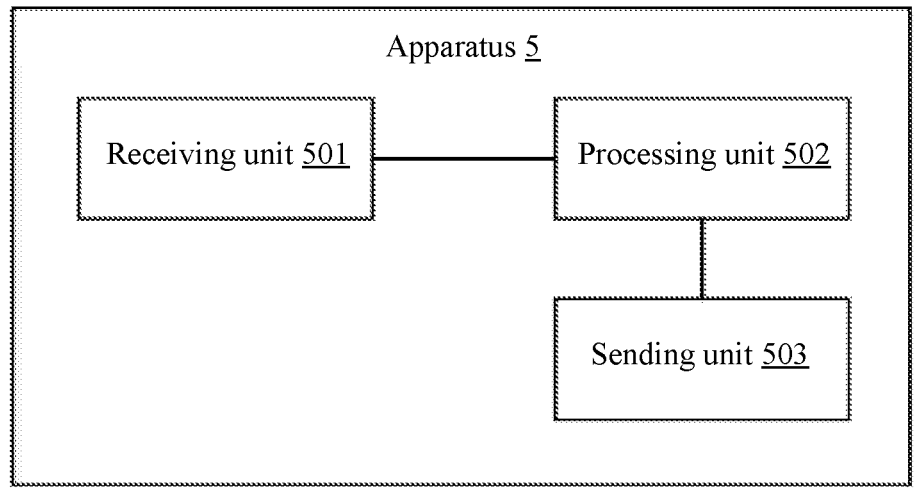
FIG. 9 is a schematic structural diagram of a lock allocation apparatus according to an embodiment of the present application.

Referring to FIG. 9, FIG. 9 is a schematic structural diagram of a lock allocation apparatus 5 according to an embodiment of the present application. An apparatus 5 corresponds to the first NC in FIG. 5A and FIG. 5B, and the apparatus 5 includes a receiving unit 501, a processing unit 502, and a sending unit 503. The lock allocation apparatus in this embodiment is configured to perform the lock allocation method in FIG. 5A and FIG. 5B. For terms and processes, refer to the descriptions in FIG. 5A and FIG. 5B. Details are not described herein again.

The receiving unit 501 is configured to receive a first migration queue generated by a second NC, where the second NC manages a first target lock, the first migration queue includes at least one lock request for requesting the first target lock, a lock request at a queue head in the first migration queue is a first lock request, and the first lock request includes an identifier of the first NC.

The processing unit 502 is configured to allocate the first target lock to a first CPU associated with the apparatus.

The receiving unit 501 is further configured to delete the first lock request when receiving a request that is for releasing the first target lock and that is sent by the first CPU.

The processing unit 502 is further configured to change a lock flag bit of a second lock request to a lock flag bit indicating a locked state when a to-be-processed lock request exists in the first migration queue. The locked state is used to indicate that the first target lock is occupied, the second lock request is a lock request at the queue head in the first migration queue from which the first lock request is deleted, the second lock request includes an identifier of a third NC, and the third NC is an NC that sends the second lock request.

The sending unit 503 is configured to send the first migration queue to the third NC that sends the second lock request.

The apparatus 5 in this embodiment of the present application may be implemented using an ASIC, or implemented using a programmable logic device (PLD). The PLD may be a complex programmable logic device (CPLD), an FPGA, a generic array logic (GAL), or any combination thereof. Alternatively, when the lock allocation method shown in FIG. 5A and FIG. 5B is implemented using software, the apparatus 5 and the modules of the apparatus 5 may also be software modules.

Optionally, before the receiving unit 501 receives the first migration queue generated by the second NC, the receiving unit 501 is further configured to receive a third lock request sent by the first CPU. The third lock request is used to request the first target lock.

The processing unit 502 is further configured to add the third lock request to a local queue, where the local queue is used to store a lock request sent by the first CPU, and replicate the third lock request to obtain the first lock request, where the first lock request carries identifier information of the first NC.

The sending unit 503 is further configured to send the first lock request to a remote queue that is associated with the first target lock and that is in the second NC. The remote queue associated with the first target lock is used to store the at least one lock request for requesting the first target lock such that the second NC takes out the at least one lock request in the remote queue associated with the first target lock to form the first migration queue.

The processing unit 502 changes, according to a lock flag bit of the first lock request, a lock flag bit of the third lock request stored in the local queue of the first NC to a lock flag bit indicating a locked state, to instruct the first CPU to access, when finding that the lock flag bit of the third lock request indicates a locked state, a shared resource corresponding to the first target lock, or changes, according to a lock flag bit of the first lock request, a lock flag bit of the third lock request stored in the local queue of the first NC to a lock flag bit indicating a locked state, and instructs the first CPU to access a shared resource corresponding to the first target lock.

Optionally, the processing unit 502 is further configured to delete the third lock request from the local queue of the apparatus.

Optionally, the sending unit 503 is further configured to send a response packet to the second NC when the first migration queue is empty. The response packet is used to indicate that the at least one lock request in the first migration queue generated by the second NC is processed.

Optionally, the processing unit 502 is further configured to select a target remote queue from at least one remote queue managed by the apparatus, where the target remote queue includes at least one lock request for requesting a second target lock, take out the at least one lock request from the target remote queue, and generate a second migration queue according to the at least one lock request, where the second migration queue includes the at least one lock requests, and change a lock flag bit of a fourth lock request at a queue head in the second migration queue to a lock flag bit indicating a locked state.

The sending unit 503 is further configured to send the second migration queue to a fourth NC that sends the fourth lock request.

The apparatus 5 according to this embodiment of the present application may correspondingly perform the method described in the embodiments of the present application. In addition, the foregoing and other operations and/or functions of the units in the apparatus 5 are separately used to implement a corresponding procedure of the method in FIG. 5A and FIG. 5B. For brevity, details are not described herein again.

During implementation of this embodiment of this application, an NC receives a migration queue that includes a plurality of lock requests for requesting a same lock, a sorting sequence of the lock requests in the migration queue is the same as a sequence in which an NC managing the lock receives a lock request sent by each CPU, and the NC allocates, to an associated CPU, the lock requested by a lock request at a queue head in the migration queue. In a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock. Further, after receiving a request that is for releasing the lock and that is sent by the CPU, the NC deletes the lock request at the queue head in the migration queue, changes a lock flag bit of a lock request at the queue head in the migration queue at a current moment, and sends the migration queue to an NC corresponding to the lock request at the queue head in the migration queue at the current moment in order to avoid a problem that a plurality of request messages are produced because after the lock is returned to the NC that manages the lock, another NC requesting the same lock requests the lock again from the NC that manages the lock, thereby reducing a quantity of request messages. Furthermore, in a process in which an NC obtains a lock, the lock is allocated, in sequence using a migration queue, to each CPU that requests the lock, and whether the lock is in a locked state is recorded using a lock flag bit in the migration queue of an NC. In the process of obtaining the lock, the CPU does not need to access a memory and a cache that are associated with the CPU in order to avoid a problem that storage bandwidth is consumed because the CPU needs to access, in a process of determining whether use of a shared resource is completed, the cache or the memory that are associated with the CPU.

Figure 10:
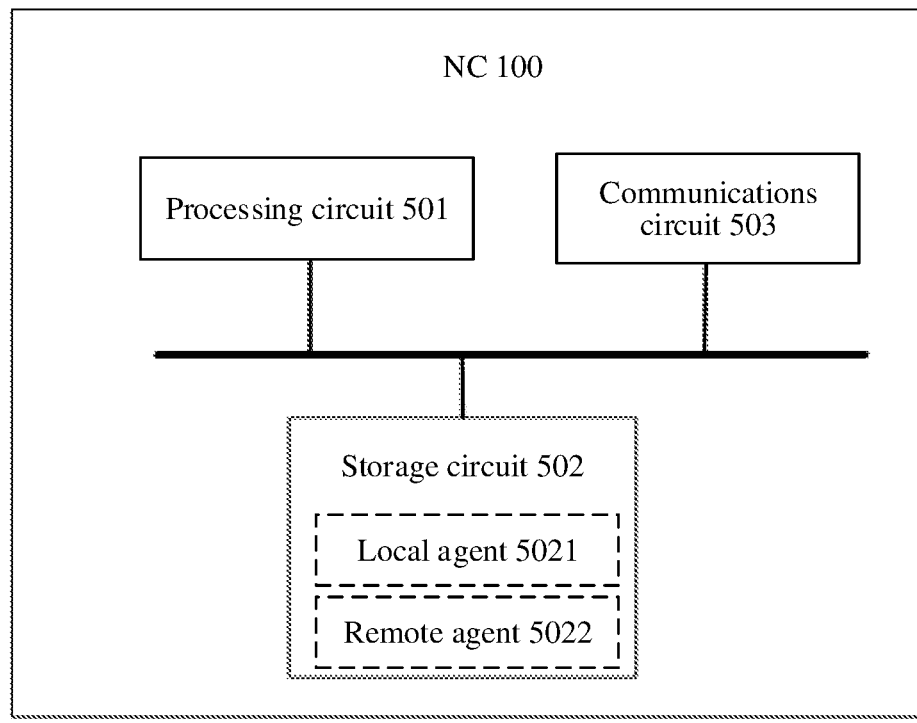
FIG. 10 is a schematic structural diagram of an NC according to an embodiment of the present application.

Referring to FIG. 10, FIG. 10 is a schematic structural diagram of an NC 100 for lock allocation according to an embodiment of the present application. The NC 100 corresponds to the first NC in FIG. 5A and FIG. 5B, and the first NC may be any NC in FIG. 3 or FIG. 4. The NC 100 includes a processing circuit 501, a storage circuit 502, and a communications circuit 503. The processing circuit 501, the storage circuit 502, and the communications circuit 503 may be connected to each other using a bus or in a direct connection manner.

The storage circuit 502 includes but is not limited to a random access memory (RAM), and the storage circuit 502 is configured to store related instructions and data. The communications circuit 503 is configured to receive and send data. The communications circuit 503 includes an interface circuit between the NC 100 and a CPU, and an interface circuit between the processing circuit 501 and the storage circuit 502. Data between the NC 100 and the CPU and data between the processing circuit 501 and the storage circuit 502 are transmitted using the communications circuit 503. The first NC in this embodiment is configured to perform the lock allocation method in FIG. 5A and FIG. 5B. For a term and a process, refer to the descriptions in FIG. 5A and FIG. 5B. Details are not described herein again.

The processing circuit 501 in the NC 100 is configured to read program code stored in the storage circuit 502, and perform the following operations of receiving a first migration queue generated by a second NC, where the second NC manages a first target lock, the first migration queue includes at least one lock request for requesting the first target lock, a lock request at a queue head in the first migration queue is a first lock request, and the first lock request includes an identifier of the first NC, allocating the first target lock to a first CPU associated with the first NC, deleting the first lock request at the queue head in the first migration queue when receiving a request that is for releasing the first target lock and that is sent by the first CPU, changing a lock flag bit of a second lock request to a lock flag bit indicating a locked state when a to-be-processed lock request exists in the first migration queue, where the locked state is used to indicate that the first target lock is occupied, the second lock request is a lock request at the queue head in the first migration queue from which the first lock request is deleted, the second lock request includes an identifier of a third NC, and the third NC is an NC that sends the second lock request, and sending the first migration queue to the third NC that sends the second lock request.

Optionally, before performing an operation of receiving the first migration queue, the processing circuit 501 is further configured to perform the following operations of receiving a third lock request sent by the first CPU, where the third lock request is used to request the first target lock, adding the third lock request to a local queue, where the local queue is used to store a lock request sent by the first CPU, adding the identifier of the first NC to the third lock request to obtain the first lock request, and sending the first lock request to a remote queue that is associated with the first target lock and that is in the second NC, where the remote queue associated with the first target lock is used to store the at least one lock request for requesting the first target lock such that the second NC takes out the at least one lock request in the remote queue associated with the first target lock to form the first migration queue.

Optionally, that the processing circuit 501 performs an operation of allocating the first target lock to the first CPU associated with the first NC includes changing, according to a lock flag bit of the first lock request, a lock flag bit of the third lock request stored in the local queue of the first NC to a lock flag bit indicating a locked state, to instruct the first CPU to access, when finding that the lock flag bit of the third lock request indicates a locked state, a shared resource corresponding to the first target lock, or changing, according to a lock flag bit of the first lock request, a lock flag bit of the third lock request stored in the local queue of the first NC to a lock flag bit indicating a locked state, and instructing the first CPU to access a shared resource corresponding to the first target lock.

Optionally, that the processing circuit 501 performs an operation of deleting the first lock request from the first migration queue when receiving the request that is for releasing the first target lock and that is sent by the first CPU further includes of deleting the third lock request from the local queue of the first NC.

Optionally, the processing circuit 501 is further configured to perform the following operation of sending a response packet to the second NC when the first migration queue is empty, where the response packet is used to indicate that the at least one lock request in the first migration queue generated by the second NC is processed.

Optionally, the processing circuit 501 is further configured to perform the following operations selecting a target remote queue from at least one remote queue managed by the first NC, where the target remote queue includes at least one lock request for requesting a second target lock, taking out the at least one lock request from the target remote queue, and generating a second migration queue according to the at least one lock request, where the second migration queue includes the at least one lock request, changing a lock flag bit of a fourth lock request at a queue head in the second migration queue to a lock flag bit indicating a locked state, where the second migration queue is a first in first out queue, and sending the second migration queue to a fourth NC that sends the fourth lock request.

In a possible implementation, the storage circuit 502 of the NC 100 further includes two software modules a local agent 5021 and a remote agent 5022. The processing circuit 501 invokes the local agent 5021 to perform an operation related to the local queue in the apparatus 5. For example, the processing circuit 501 invokes the local agent 5021 to perform operations such as an enqueue operation, a dequeue operation, and sending a lock request. The processing circuit 501 invokes the remote agent 5022 to perform an operation related to all remote queues in the apparatus 5. For example, the remote agent 5022 performs operations such as selecting a remote queue, an enqueue operation, a dequeue operation, generating a migration queue, allocating a lock, and sending a migration queue.

It should be understood that the NC 100 for lock allocation according to this embodiment of the present application may be corresponding to the first NC in the method shown in FIG. 5A and FIG. 5B in the embodiments of the present application and the apparatus 5 in FIG. 9. In addition, the foregoing and other operations and/or functions of the modules in the NC 100 are separately used to implement a corresponding procedure of the method in FIG. 5A and FIG. 5B. For brevity, details are not described herein.

During implementation of this embodiment of this application, an NC receives a migration queue that includes a plurality of lock requests for requesting a same lock, a sorting sequence of the lock requests in the migration queue is the same as a sequence in which an NC managing the lock receives a lock request sent by each CPU, and the NC allocates, to an associated CPU, the lock requested by a lock request at a queue head in the migration queue. In a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock. Further, after receiving a request that is for releasing the lock and that is sent by the CPU, the NC deletes the lock request at the queue head in the migration queue, changes a lock flag bit of a lock request at the queue head in the migration queue at a current moment, and sends the migration queue to an NC corresponding to the lock request at the queue head in the migration queue at the current moment in order to avoid a problem that a plurality of request messages are produced because after the lock is returned to the NC that manages the lock, another NC requesting the same lock requests the lock again from the NC that manages the lock, thereby reducing a quantity of request messages. Furthermore, in a process in which an NC obtains a lock, the lock is allocated, in sequence using a migration queue, to each CPU that requests the lock, and whether the lock is in a locked state is recorded using a lock flag bit in the migration queue of an NC. In the process of obtaining the lock, the CPU does not need to access a memory and a cache that are associated with the CPU in order to avoid a problem that storage bandwidth is consumed because the CPU needs to access, in a process of determining whether use of a shared resource is completed, the cache or the memory that are associated with the CPU.

Referring to FIG. 3 and FIG. 4, FIG. 3 and FIG. 4 are schematic structural diagrams of a computing device according to an embodiment of the present application. In this embodiment of the present application, the computing device includes n processors (a CPU 11 to a CPU 1*n*) and n NCs (an NC 21 to an NC 2*n*), and n is an integer greater than 1. The n NCs include a first NC, a second NC, and a third NC. The n processors include a first processor, a second processor, and a third processor. The first NC has a mapping relationship with the first processor, the second NC has a mapping relationship with the second processor, and the third NC has a mapping relationship with the third processor. Each NC manages a local queue and at least one remote queue. The local queue is used to store a lock request sent by a CPU that has a mapping relationship with the NC. Each remote queue is associated with a lock resource managed by an NC lock. Both the local queue and the remote queue are first in first out queues. For a term and a specific process in this embodiment of the present application, refer to the descriptions in FIG. 5A and FIG. 5B. Details are not described herein again.

The first processor is configured to send a third lock request to the associated first NC, where the third lock request is used to request a first target lock, query a lock flag bit of the third lock request in a local queue of the first NC, and when finding that the lock flag bit of the third lock request indicates a locked state, access a shared resource corresponding to the first target lock, and after completing the access to the shared resource, send, to the first NC, a request for releasing the first target lock.

The first NC is configured to receive the third lock request sent by the first processor, and add the third lock request to the local queue, add an identifier of the first NC to the third lock request to obtain a first lock request, send the first lock request to the second NC that manages the first target lock, and send the first lock request to a remote queue that is associated with the first target lock and that is in the second NC that manages the first target lock. The local queue of the first NC is used to store a lock request sent by the first processor, and the remote queue associated with the first target lock is used to store at least one lock request for requesting the first target lock.

The second NC is configured to receive the first lock request, add the first lock request to the remote queue associated with the first target lock, take out at least one lock request from the remote queue associated with the first target lock to generate a first migration queue, change a lock flag bit of the first lock request at a queue head in the first migration queue to a lock flag bit indicating a locked state, and send the first migration queue to the first NC. The first migration queue is a first in first out queue.

The first NC is further configured to receive the first migration queue, allocate the first target lock to the first processor, and delete the first lock request from the first migration queue when receiving the request that is for releasing the first target lock and that is sent by the first processor, change a lock flag bit of a second lock request at the queue head in the first migration queue at a current moment to a lock flag bit indicating a locked state when a to-be-processed lock request exists in the first migration queue, where the locked state is used to indicate that the first target lock is occupied, and send the first migration queue to the third NC that sends the second lock request, to instruct the third NC to change, according to the lock flag bit of the second lock request, a lock flag bit that is of a lock request corresponding to the second lock request and that is in a local queue of the third NC, where the local queue of the third NC is used to store a lock request sent by the CPU associated with the third NC.

The third NC is configured to receive the first migration queue sent by the first NC.

The processor in this embodiment of the present application may be a CPU. The processor may be further another general purpose processor, a DSP, an ASIC, an FPGA or another PLD, a discrete gate or a transistor logic device, a discrete hardware component, or the like. The general purpose processor may be a microprocessor or any conventional processor.

Optionally, that the first NC performs an operation of determining the first lock request at the queue head in the first migration queue and allocating the first target lock to the first CPU associated with the first NC includes changing, according to the lock flag bit of the first lock request, the lock flag bit of the third lock request stored in the local queue of the first NC to a lock flag bit indicating a locked state, to instruct the first CPU to access, when finding that the lock flag bit of the third lock request indicates a locked state, the shared resource corresponding to the first target lock, or changing, according to the lock flag bit of the first lock request, the lock flag bit of the third lock request stored in the local queue of the first NC to a lock flag bit indicating a locked state, and instructing the first CPU to access the shared resource corresponding to the first target lock.

Optionally, the first NC is further configured to delete the third lock request from the local queue of the first NC when receiving the request that is for releasing the first target lock and that is sent by the first CPU.

Optionally, the first NC is further configured to send a response packet to the second NC when no to-be-processed lock request exists in the first migration queue, where the response packet is used to indicate that the at least one lock request in the first migration queue generated by the second NC is processed.

During implementation of this embodiment of this application, an NC receives a migration queue that includes a plurality of lock requests for requesting a same lock, a sorting sequence of the lock requests in the migration queue is the same as a sequence in which an NC managing the lock receives a lock request sent by each CPU, and the NC allocates, to an associated CPU, the lock requested by a lock request at a queue head in the migration queue. In a process in which a CPU requesting a lock obtains a lock, a CPU managing the lock does not need to send a listening request, and the CPU requesting the lock does not need to receive a listening response sent by another CPU either. Therefore, each CPU in a computing device is prevented from receiving and sending a large quantity of packets, thereby reducing a delay of obtaining the lock. Further, after receiving a request that is for releasing the lock and that is sent by the CPU, the NC deletes the lock request at the queue head in the migration queue, changes a lock flag bit of a lock request at the queue head in the migration queue at a current moment, and sends the migration queue to an NC corresponding to the lock request at the queue head in the migration queue at the current moment in order to avoid a problem that a plurality of request messages are produced because after the lock is returned to the NC that manages the lock, another NC requesting the same lock requests the lock again from the NC that manages the lock, thereby reducing a quantity of request messages. Furthermore, in a process in which an NC obtains a lock, the lock is allocated, in sequence using a migration queue, to each CPU that requests the lock, and whether the lock is in a locked state is recorded using a lock flag bit in the migration queue of an NC. In the process of obtaining the lock, the CPU does not need to access a memory and a cache that are associated with the CPU in order to avoid a problem that storage bandwidth is consumed because the CPU needs to access, in a process of determining whether use of a shared resource is completed, the cache or the memory that are associated with the CPU.

All or some of the foregoing embodiments may be implemented through software, hardware, firmware, or any combination thereof. When software is used to implement the embodiments, all or some of the foregoing embodiments may be implemented in a form of a computer program product. The computer program product includes one or more computer instructions. When the computer program instruction is loaded or executed on a computer, all or some of the procedures or functions according to the embodiments of the present application are generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid state drive (SSD).

The foregoing descriptions are merely specific implementations of the present application. A person skilled in the art may readily figure out variation or replacement according to the specific implementations provided in the present application.

What is claimed is:

1. A lock allocation method implemented by a first node controller (NC) and comprising:
   receiving, from a second NC managing a first target lock, a first migration queue comprising at least one lock request for requesting the first target lock, wherein a first lock request is at a first queue head in the first migration queue and comprises a first identifier of the first NC;
   allocating the first target lock to a first central processing unit (CPU) associated with the first NC;
   deleting the first lock request when receiving a request for releasing the first target lock from the first CPU;
   changing a second lock flag bit of a second lock request to a locked state when a to-be-processed lock request exists in the first migration queue from which the first lock request is deleted, wherein the locked state indicates that the first target lock is occupied, wherein the second lock request is at the first queue head in the first migration queue from which the first lock request is deleted, and wherein the second lock request comprises a third identifier of a third NC sending the second lock request;
   sending a response packet to the second NC when the first migration queue from which the first lock request is deleted is empty, wherein the response packet indicates that all lock requests in the first migration queue are processed, wherein the lock requests comprise the at least one lock request; and
   sending the first migration queue to the third NC to instruct the third NC to change, based on the second lock flag bit, a lock flag bit of a lock request corresponding to the second lock request in a third local queue of the third NC and storing a lock request from a CPU associated with the third NC.

2. The lock allocation method of claim 1, wherein before receiving the first migration queue, the lock allocation method further comprises:
   receiving, from the first CPU, a third lock request requesting the first target lock;
   adding the third lock request to a first local queue of the first NC, wherein the first local queue is configured to store a lock request from the first CPU;
   adding, the first identifier to the third lock request to obtain the first lock request; and
   sending the first lock request to a remote queue associated with the first target lock and storing the at least one lock request to enable the second NC to remove the at least one lock request in the remote queue to form the first migration queue.

3. The lock allocation method of claim 2, wherein allocating the first target lock comprises changing, based on a first lock flag bit of the first lock request, a third lock flag bit of the third lock request stored in the first local queue to the locked state to instruct the first CPU to access a shared resource corresponding to the first target lock when the third lock flag bit indicates the locked state.

4. The lock allocation method of claim 2, wherein allocating the first target lock comprises changing, based on a first lock flag bit of the first lock request, a third lock flag bit of the third lock request stored in the first local queue to the locked state.

5. The lock allocation method of claim 2, wherein deleting the first lock request comprises deleting the third lock request from the first local queue.

6. The lock allocation method of claim 4, wherein allocating the first target lock further comprises instructing the first CPU to access a shared resource corresponding to the first target lock.

7. The lock allocation method of claim 1, further comprising:
   selecting at least one remote queue managed by the first NC as a target remote queue, wherein the target remote queue comprises at least one lock request for requesting a second target lock;
   removing the at least one lock request for requesting the second target lock from the target remote queue;
   generating a second migration queue according to the at least one lock request for requesting the second target lock, wherein the second migration queue comprises the at least one lock request for requesting the second target lock;
   changing a fourth lock flag bit of a fourth lock request at a second queue head in the second migration queue to the locked state; and
   sending the second migration queue to a fourth NC sending the fourth lock request.

8. A computing device comprising:
   a plurality of central processing units (CPUs) comprising a first CPU and a second CPU; and
   a plurality of node controllers (NCs) in a one-to-one correspondence with the CPUs, wherein the NCs comprise a first NC associated with the first CPU, a second NC, and a third NC associated with the second CPU,
   wherein the first CPU is configured to:
      send, to the first NC, a third lock request requesting a first target lock;
      query a third lock flag bit of the third lock request in a first local queue of the first NC;
      access a shared resource corresponding to the first target lock when the third lock flag bit indicates a locked state; and
      send, to the first NC, a request for releasing the first target lock after accessing the shared resource,
   wherein the first NC is configured to:
      receive the third lock request from the first CPU;
      add the third lock request to the first local queue;
      add a first identifier of the first NC to the third lock request to obtain a first lock request; and
      send the first lock request to the second NC managing the first target lock, wherein the first local queue is configured to store a lock request from the first CPU, and wherein a remote queue of the first NC and associated with the first target lock is configured to store at least one lock request for requesting the first target lock, wherein the second NC is configured to:
receive the first lock request;
add the first lock request to the remote queue;
remove the at least one lock request from the remote queue to generate a first migration queue, wherein a lock request at a first queue head in the first migration queue is the first lock request, and wherein the first lock request comprises the first identifier;
change a first lock flag bit of the first lock request to the locked state; and
send the first migration queue to the first NC, wherein the first NC is further configured to:
receive the first migration queue;
allocate the first target lock to the first CPU;
delete the first lock request at the first queue head when receiving the request from the first CPU;
change a second lock flag bit of a second lock request to the locked state when a to-be-processed lock request exists in the first migration queue from which the first lock request is deleted, wherein the second lock request is at the first queue head in the first migration queue from which the first lock request is deleted, wherein the locked state indicates that the first target lock is occupied, wherein the second lock request comprises a third identifier of the third NC sending the second lock request; and
send the first migration queue to the third NC, and wherein the third NC is configured to:
receive the first migration queue from the first NC; and
change, according to the second lock flag bit, a lock flag bit of a lock request corresponding to the second lock request in a third local queue of the third NC and storing a lock request from the second CPU.

9. The computing device of claim 8, wherein the first NC is further configured to further allocate the first target lock to the first CPU by changing, according to the first lock flag bit, the third lock flag bit to the locked state to instruct the first CPU to access the shared resource when the third lock flag bit indicates the locked state.

10. The computing device of claim 8, wherein the first NC is further configured to further allocate the first target lock to the first CPU by:
changing, according to the first lock flag bit, the third lock flag bit to the locked state; and
instructing the first CPU to access the shared resource.

11. The computing device of claim 8, wherein the first NC is further configured to:
receive the request from the first CPU; and
delete the third lock request from the first local queue.

12. The computing device of claim 8, wherein the first NC is further configured to:
detect that the first migration queue does not comprises a to-be-processed lock request; and
send a response packet to the second NC indicating that the at least one lock request is processed.

13. A first node controller (NC) comprising:
a storage circuit configured to store instructions; and
a processor coupled to the storage circuit and configured to execute the instructions to:
receive, from a second NC managing a first target lock, a first migration queue comprising at least one lock request for requesting the first target lock, wherein a first lock request is at a first queue head in the first migration queue and comprises a first identifier of the first NC;
allocate the first target lock to a first central processing unit (CPU) associated with the first NC;
delete the first lock request when receiving a request for releasing the first target lock from the first CPU;
change a second lock flag bit of a second lock request to a locked state when a to-be-processed lock request exists in the first migration queue from which the first lock request is deleted, wherein the locked state indicates that the first target lock is occupied, wherein the second lock request is at the first queue head in the first migration queue from which the first lock request is deleted, and wherein the second lock request comprises a third identifier of a third NC sending the second lock request;
send a response packet to the second NC when the first migration queue from which the first lock request is deleted is empty, wherein the response packet indicates that all lock requests in the first migration queue are processed, wherein the lock requests comprise the at least one lock request; and
send the first migration queue to the third NC to instruct the third NC to change, based on the second lock flag bit, a lock flag bit of a lock request corresponding to the second lock request in a third local queue of the third NC and storing a lock request from a CPU associated with the third NC.

14. The first NC of claim 13, wherein before receiving the first migration queue, the processor is further configured to:
receive, from the first CPU, a third lock request requesting the first target lock;
add the third lock request to a first local queue of the first NC, wherein the first local queue is configured to store a lock request from the first CPU;
add the first identifier to the third lock request to obtain the first lock request; and
send the first lock request to a remote queue associated with the first target lock and storing the at least one lock request to enable the second NC to remove the at least one lock request in the remote queue to form the first migration queue.

15. The first NC of claim 14, wherein the processor is further configured to further allocate the first target lock by changing, based on a first lock flag bit, a third lock flag bit of the third lock request stored in the first local queue to the locked state to instruct the first CPU to access a shared resource corresponding to the first target lock when the third lock flag bit indicates the locked state.

16. The first NC of claim 14, wherein the processor is further configured to further allocate the first target lock by:
changing, based on a first lock flag bit of the first lock request, a third lock flag bit of the third lock request to the locked state; and
instructing the first CPU to access a shared resource corresponding to the first target lock.

17. The first NC of claim 14, wherein the processor is further configured to further delete the first lock request by deleting the third lock request from the first local queue.

18. The first NC of claim 13, wherein the processor is further configured to detect that the first migration queue from which the first lock request is empty.

19. The first NC of claim 13, wherein the processor is further configured to:

select at least one remote queue managed by the first NC as a target remote queue, wherein the target remote queue comprises at least one lock request for requesting a second target lock; and remove the at least one lock request for requesting the second target lock from the target remote queue.

20. The first NC of claim 19, wherein the processor is further configured to:

generate a second migration queue according to the at least one lock request for requesting the second target lock, wherein the second migration queue comprises the at least one lock request for requesting the second target lock;

change a fourth lock flag bit of a fourth lock request at a second queue head in the second migration queue to the locked state; and send the second migration queue to a fourth NC sending the fourth lock request.

* * * * *